US011002633B2

(12) United States Patent
Correia

(10) Patent No.: US 11,002,633 B2
(45) Date of Patent: May 11, 2021

(54) METHOD FOR RELIABILITY TESTING OF A DRIVEN COMPONENT

(71) Applicant: Vestas Wind Systems A/S, Aarhus (DK)

(72) Inventor: Antonio Correia, Dortmund (DE)

(73) Assignee: Vestas Wind Systems A/S, Aarhus N. (DK)

(*) Notice: Subject to any disclaimer, the term of this patent is extended or adjusted under 35 U.S.C. 154(b) by 210 days.

(21) Appl. No.: 16/342,333

(22) PCT Filed: Sep. 28, 2017

(86) PCT No.: PCT/DK2017/050316
§ 371 (c)(1),
(2) Date: Apr. 16, 2019

(87) PCT Pub. No.: WO2018/072794
PCT Pub. Date: Apr. 26, 2018

(65) Prior Publication Data
US 2019/0277726 A1    Sep. 12, 2019

(30) Foreign Application Priority Data
Oct. 17, 2016   (DK) ............................ PA 2016 70815

(51) Int. Cl.
*G01M 13/00*     (2019.01)
*G06F 11/00*     (2006.01)
(Continued)

(52) U.S. Cl.
CPC ............. *G01M 13/00* (2013.01); *F03D 80/50* (2016.05); *G01M 13/04* (2013.01); *G06F 11/008* (2013.01); *F03D 17/00* (2016.05)

(58) Field of Classification Search
CPC combination set(s) only.
See application file for complete search history.

(56) References Cited

U.S. PATENT DOCUMENTS 5,715,180 A * 2/1998 Hu .................. G06Q 10/04
                                          700/109
5,717,607 A   2/1998 Hu
(Continued)

FOREIGN PATENT DOCUMENTS

CN      1867817 A    11/2006
CN    101413991 A     4/2009
(Continued)

OTHER PUBLICATIONS

European Patent Office, Examination Report in EP Application No. 17779997.0, dated Jul. 7, 2020.
(Continued)

*Primary Examiner* — Jennifer E Simmons
(74) *Attorney, Agent, or Firm* — Wood Herron & Evans LLP

(57) ABSTRACT

A method is provided for testing a reliability of a plurality of driven components (22, 24, 30), such as those to be used as power train elements in one or more wind turbines. The method includes conducting physical success run testing on a test bench (42) of a first subset of test specimens (50) provided for the driven components (22, 24, 30), determining a minimum test duration needed for one of a second subset of test specimens (50) that will be required to confirm reliability of the driven components (22, 24, 30) at a predetermined target confidence level, and conducting physical success run testing of the second subset of the test specimens (50). The planning and evaluation of physical testing according to the methods described herein avoid excessive, unnecessary use of the test bench (42) and other resources. As such, results of desired confidence levels for operators of driven components (22, 24, 30) such as wind turbine operators can be reliably provided.

9 Claims, 22 Drawing Sheets

(51) Int. Cl.
    *F03D 17/00*     (2016.01)
    *F03D 80/50*     (2016.01)
    *G01M 13/04*     (2019.01)

(56) References Cited

U.S. PATENT DOCUMENTS

| | | | |
|---|---|---|---|
| 6,038,517 A * | 3/2000 | Dobbins | G06F 11/008 702/82 |
| 7,120,566 B1 | 10/2006 | Brand et al. | |
| 7,260,509 B1 | 8/2007 | Brand et al. | |
| 2007/0079190 A1 | 4/2007 | Hillman et al. | |
| 2010/0023277 A1 | 1/2010 | Liu et al. | |

FOREIGN PATENT DOCUMENTS

| | | |
|---|---|---|
| CN | 103592141 A | 2/2014 |
| CN | 105699058 A | 6/2016 |
| JP | 2008145414 A | 6/2008 |

OTHER PUBLICATIONS

China National Intellectual Property Administration, First Notification of Office Action in CN Application No. 201780070932.5, dated Jun. 2, 2020.
Igor Bazovsky, Reliability Theory and Practice, Dec. 31, 1961, Dover Publications Inc., XP055436252, ISBN: 978-0-486-43867-2, pp. 2, 272-273.
Andre V. Kleyner, Determining Optimal Reliability Targets Through Analysis of Product Validation Cost and Field Warranty Data, Nov. 22, 2005, XP055436258, https://drum.lib.umd.edu/bitstreams/handle/1903/3107/umi-umd-2920.pdf?segquence=1, pp. 177-181.
Danish Patent and Trademark Office, Search and Examination Report in PA 2016 70815, dated Jan. 25, 2017.
European Patent Office, International Search Report and Written Opinion in PCT Application No. PCT/DK2017/050316, dated Jan. 3, 2018.
European Patent Office, International Preliminary Report on Patentability in PCT Application No. PCT/DK2017/050316, dated Oct. 12, 2018.

* cited by examiner

| | A | C | E | F | G | I | M | O |
|---|---|---|---|---|---|---|---|---|
| 3 | | | | | | | | |
| 4 | | | R | 0.9 | | | | |
| 5 | | | C | 0.5 | | | | |
| 6 | | | Ns | =ROUNDUP(LN(1-F5)/LN(F4);0) | specimens | | | |
| 7 | | | Nn | 4 | specimens | | | |
| 8 | | | b | 1.5 | | | | |
| 9 | | | Ts | 10 | hours | | | |
| 12 | | | Tn | =F9*(F6/F7)^(1/F8) | hours | | | |
| 18 | | | | | | | | |
| 19 | | | | | non-cumulative | | cumulative | |
| 20 | | | i | tn | ns | c | Ns | C |
| 21 | | | 0 | | | | | |
| 22 | | | 1 | =F$12 | =E22*(F22/$F$9)^$F$8 | =1-(F$4^(G22)) | =SUM($G$22:G22) | =1-(F$4^M22) |
| 23 | | | 2 | =F$12 | =E23*(F22/$F$9)^$F$8 | =1-(F$4^(G23)) | =SUM($G$22:G23) | =1-(F$4^M23) |
| 24 | | | 3 | =F$12 | =E24*(F22/$F$9)^$F$8 | =1-(F$4^(G24)) | =SUM($G$22:G24) | =1-(F$4^M24) |
| 25 | | | 4 | =F$12 | =E25*(F22/$F$9)^$F$8 | =1-(F$4^(G25)) | =SUM($G$22:G25) | =1-(F$4^M25) |

FIG. 7

|   | A | C | E | F | G | I | M | O |
|---|---|---|---|---|---|---|---|---|
| 3 |   |   |   |   |   |   |   |   |
| 4 |   |   | R | 0,9 |   |   |   |   |
| 5 |   |   | C | 0,5 |   |   |   |   |
| 6 |   |   | Ns | 7,00 | specimens |   |   |   |
| 7 |   |   | Nn | 4 | specimens |   |   |   |
| 8 |   |   | b | 1,5 |   |   |   |   |
| 9 |   |   | Ts | 10 | hours |   |   |   |
| 12 |   |   | Tn | 14,5 | hours |   |   |   |
| 18 |   |   |   |   |   |   |   |   |
| 19 |   |   |   | non-cumulative | | | cumulative | |
| 20 |   | j | nn | tn | ns | c | Ns | C |
| 21 |   | 0 |   |   |   |   |   |   |
| 22 |   | 1 | 1 | 14,5 | 1,75 | 0,17 | 1,75 | 0,168 |
| 23 |   | 2 | 1 | 14,5 | 1,75 | 0,17 | 3,50 | 0,308 |
| 24 |   | 3 | 1 | 14,5 | 1,75 | 0,17 | 5,25 | 0,425 |
| 25 |   | 4 | 1 | 14,5 | 1,75 | 0,17 | 7,00 | 0,522 |

FIG. 8

| variant | specimen | non-cumulative | | | | cumulative | |
|---|---|---|---|---|---|---|---|
| i | j | nn | tn | ns | c | Ns | C |
| 1 | 0 | | | | | | |
| 1 | 1 | nn11 | tn11 | ns11 | c11 | Ns11 | C11 |
| 1 | 2 | nn12 | tn12 | ns12 | c12 | Ns12 | C12 |
| 1 | 3 | nn13 | tn13 | ns13 | c13 | Ns13 | C13 |
| 1 | 4 | nn14 | tn14 | ns14 | c14 | Ns14 | C14 |
| | | | | | | | |
| | | | | | | | |
| 2 | 0 | | | | | | |
| 2 | 1 | nn21 | tn21 | ns21 | c21 | Ns21 | C21 |
| 2 | 2 | nn22 | tn22 | ns22 | c22 | Ns22 | C22 |
| 2 | 3 | nn23 | tn23 | ns23 | c23 | Ns23 | C23 |
| 2 | 4 | nn24 | tn24 | ns24 | c24 | Ns24 | C24 |
| | | | | | | | |
| | | | | | | | |
| 3 | 0 | | | | | | |
| 3 | 1 | nn31 | tn31 | ns31 | c31 | Ns31 | C31 |
| 3 | 2 | nn32 | tn32 | ns32 | c32 | Ns32 | C32 |
| 3 | 3 | nn33 | tn33 | ns33 | c33 | Ns33 | C33 |
| 3 | 4 | nn34 | tn34 | ns34 | c34 | Ns34 | C34 |
| | | | | | | | |
| | | | | | | | |
| 4 | 0 | | | | | | |
| 4 | 1 | nn41 | tn41 | ns41 | c41 | Ns41 | C41 |
| 4 | 2 | nn42 | tn42 | ns42 | c42 | Ns42 | C42 |
| 4 | 3 | nn43 | tn43 | ns43 | c43 | Ns43 | C43 |
| 4 | 4 | nn44 | tn44 | ns44 | c44 | Ns44 | C44 |
| | | | | | | | |
| | | | | | | | |

FIG. 10

Classical Success Run Testing Costs Of Variant 3

| Variant i | Specimen j | Cost of specimen | Number of specimens | Specimens total costs | Duration units | Cost of duration unit | Duration cost | Total costs |
|---|---|---|---|---|---|---|---|---|
| 3 | 3 | 1 | 1 | 1 | 22 | 1 | 22 | 23 |
| 3 | 4 | 1 | 1 | 1 | 22 | 1 | 22 | 23 |
| Total | | | 2 | 2 | 44 | | 44 | 46 |

Physical/Virtual Success Run Testing Costs Of Variant 3

| Variant i | Specimen j | Cost of specimen | Number of specimens | Specimens total costs | Duration units | Cost of duration unit | Duration cost | Total costs |
|---|---|---|---|---|---|---|---|---|
| 3 | 3 | 1 | 1 | 1 | 22 | 1 | 22 | 23 |
| 3 | 4 | 1 | 1 | 1 | 7 | 1 | 7 | 8 |
| Total | | | 2 | 2 | 29 | | 29 | 31 |

Color code: inputs / calculated

Costs saved = 46−31 = 15

Costs saving ratio (variant 3 only) = 1−(31/46) = 33%

FIG. 20

METHOD FOR RELIABILITY TESTING OF A DRIVEN COMPONENT

TECHNICAL FIELD

The invention relates to a method for testing reliability of products, particularly by using planning and evaluation of physical testing of component samples like wind turbine components to evaluate reliability to a desired confidence level with minimized use of testing resources.

BACKGROUND

As the world has looked for alternative energy sources to replace overreliance on fossil fuels, one solution has been the use of wind turbines to generate electrical power. More specifically, these wind turbines are typically large, utility-scale horizontal-axis wind turbine generators (HAWTs), which often include a plurality of rotor blades mounted to a supporting structure, usually in the form of a tall, tubular tower. One problem with the use of HAWTs for power generation is maintaining the turbines to prevent power disruptions due to failure of the components in the turbines, as the power grid requires a constant supply of energy from its sources. Most HAWTs are located in wind parks with multiple turbines, with these wind parks often being situated in remote areas such as offshore rig installations to take advantage of prevalent weather patterns in the area. In these remote and/or offshore areas, the wind turbines are often exposed to extreme environmental conditions, which include, but are not limited to: extreme temperatures, rain, snow, blowing debris, and rough seas.

There are at least two problems associated with placing the wind parks in these remote locations. A first problem is the aforementioned extreme environmental conditions, which may cause premature failure of components in the HAWTs. A second problem is that inspection and maintenance of the HAWTs is difficult and often times expensive to complete. Therefore, those skilled in the art are constantly striving to find ways to minimize the amount and frequency of on-site inspections and maintenance while keeping a maximum number of wind turbines operational at all times for the sake of providing consistent power to the power grid.

In HAWTs, the generating components, including the generator, gearbox, drive train and brake assembly, are located at the top of the tower in a nacelle behind the hub of the rotor blades. As such, access to these generating components for maintenance and/or replacement is further rendered complex by the tall height of the tower. Combining the difficulty of accessing remote and/or offshore locations of HAWTs in some wind parks with the complexities of performing maintenance or replacement actions at the top of a tall wind turbine tower, it becomes abundantly clear why unscheduled maintenance and downtime for component failures is one of the biggest design concerns facing companies who operate HAWTs for power generation. In this regard, it is highly desirable in this field to minimize unscheduled maintenance.

One method by which this design concern of component maintenance and upkeep is handled includes sophisticated ongoing testing and monitoring of components during operation, as described in U.S. Pat. No. 9,103,323, which is owned by the original assignee of the present application. However, such ongoing testing may require additional costs to be borne by the operator of the wind turbines, which cuts into the bottom line cost efficiency when operating HAWTs. Another method for addressing the design concern of component maintenance and upkeep includes reliably anticipating when maintenance will be required in a HAWT, such that maintenance actions can be scheduled when most convenient and when any disruption to the power supply will be of minimal impact. To do this, product testing of reliability and lifespan of components needs to be conducted before those components are mass produced and installed in a plurality of HAWTs. Indeed, this is the approach taken by most operators of HAWTs, as the upfront reliability testing can provide a certain acceptable confidence level that any premature failures of components will be outside the norm, especially when considered in bulk across a plurality of installations using the components.

In conventional methods for such product reliability testing, a certain number of component samples for each product must be physically tested by driving those components on a test bench to subject the components to loads and stresses expected in the real-world installation of these parts. One type of these tests runs component samples until a failure occurs to determine confidence levels of reaching a certain desired life span, while another type of the tests, referred to as "success run testing," includes running a certain number of component samples to the same test duration value to determine reliability and confidence levels of reaching a certain desired life span. In all types of reliability testing, the specific number of component samples (or the specific duration of total testing) is generally driven by a statistics-based analysis of a predetermined desired confidence level that a customer or operator wants (e.g., a 90% confidence level that a component, under expected operational conditions, will survive with 99% reliability through a set life span before maintenance or replacement is required). Generally speaking, the higher the reliability and confidence level, the more component samples (or more overall test duration) will be necessary during the physical testing process.

Thus, depending on the reliability and confidence demands of customers of these wind turbine component manufacturers, a significant number (e.g., 10 or more) of component samples may need to be physically tested to provide the desired reliability test results. Put another way, a significant lengthy test duration may be required if a set, small number of components samples are to be physically tested to reach the desired reliability results. A significant cost and/or time outlay is required to provide the test results using the conventional methods, particularly where the customer orders components in relatively small batches rather than in bulk. Nevertheless, either the manufacturer or the end consumer continues to pay the additional cost for having this extensive physical testing done in view of the critical nature in this field of assuring reliability for a set life span and avoiding unscheduled maintenance as much as possible.

Consequently, it would be desirable to provide an improved method of testing the reliability of wind turbine components used in HAWTs, particularly by reducing the cost and time associated with physical testing of component samples, thereby speeding up the timeline for starting full production of a driven component product and putting it on the marketplace.

SUMMARY

In accordance with one embodiment of the invention, a method is provided for testing the reliability of a plurality of driven components. Each of the driven components defines an acceleration factor for reliability testing. At least one test specimen is provided for each of the driven components. The test specimens are divided into a first subset and a second subset. The method includes conducting, with a test bench and a drive unit coupled to a processor, physical success run testing of the first subset of the test specimens, with each of the test specimens in the first subset being driven for a corresponding test duration. Then the processor calculates a first confidence level achieved for reliability of the driven components based on the physical success run testing of the first subset. Moreover, the processor calculates a minimum test duration for one of the second subset of test specimens that will be required to confirm reliability of the driven components at a predetermined target confidence level, which is based upon the acceleration factor and the first confidence level that has been achieved. The method further includes conducting with the test bench and the drive unit physical success run testing of the second subset of test specimens, with the one of the second subset of test specimens being driven for the minimum test duration that was calculated. The method also includes reporting, by an output device, the cumulative confidence level achieved for the reliability of the driven components based on successful conducting of the physical success run testing.

In one aspect, the method also includes calculating with the processor a test duration for one of the first subset of test specimens based upon the corresponding acceleration factor. During the physical success run testing of the first subset of test specimens, each test specimen in the first subset is operated by the drive unit for the same test duration. Likewise, during the physical success run testing of the second subset of test specimens, each test specimen in the second subset is operated for the same minimum test duration that has been calculated. For example, the plurality of driven components in such an aspect includes a plurality of different products tested in parallel on the test bench. Thus, the first subset of test specimens includes one of each of the plurality of different products tested in parallel, and the second subset of test specimens also includes one of each of the plurality of different products tested in parallel. In one particular embodiment, these different products could include a gearbox and a main bearing in a wind turbine drive train.

In another aspect which may be combined with any other features described herein, the plurality of driven components includes a plurality of component variants defined by either similar products with variations between products that do not make the variants behave differently in success run testing, or equivalent products subjected to different loads in actual use. In a further aspect of such embodiments, the second subset of test specimens includes all test specimens for one selected component variant, while the first subset of test specimens includes all test specimens not associated with the one selected component variant. The method also includes conducting with the processor virtual success run testing of an additional plurality of imaginary test specimens of the plurality of component variants. These test specimens are deemed "imaginary" only in the sense that they do not need to be physical component samples for testing at the test bench. For each test specimen physically tested in the first and second subsets, an imaginary test specimen for all other component variants is virtually tested for a same test duration, thereby providing reliability and confidence level results for all component variants over the same test duration. In such embodiments, reporting the cumulative confidence level achieved for the plurality of driven components is based on successful conducting of physical and virtual success run testing. The conducting of the physical success run testing for the second subset of test specimens over the minimum test duration avoids excessive, unnecessary use of the test bench.

In another aspect which may be combined with any other features described herein, the specific steps for calculating the test duration for a selected one of the test specimens may include the following. The test duration calculation begins with having the processor apply a Lipson equation to calculate one modified test duration under normal conditions for the driven component associated with the selected one test specimen. The processor then calculates one modified test duration under accelerated test bench conditions for the driven component associated with the selected one test specimen based on the corresponding acceleration factor and the at least one modified test duration under normal conditions for the corresponding driven component.

In yet another aspect of the invention and combinable with any other features described herein, the conducting of the physical success run testing for a selected first test specimen includes a series of steps. To this end, the physical testing includes mounting the first test specimen on the test bench, and operating the drive unit to apply accelerated loads to the first test specimen on the test bench for the test duration associated with that first test specimen.

In another aspect which may be combined with any other features described herein, calculating the confidence level achieved for reliability following a successful test of a selected test specimen further includes a series of calculation steps. In this regard, the confidence level calculation begins with applying a Lipson equation to calculate a total number of test specimens that would need to be tested for an original test duration equal to the desired running time in use for which reliability is being tested. The processor then applies a success run equation using the total number of specimens to calculate a non-cumulative, individual confidence level achieved by successful test of the selected test specimen. The processor then turns to cumulative variable values by applying a summing function to calculate a cumulative total number of specimens that would need to be tested for the original test duration for all test specimens of the driven component tested thus far, followed by application of the success run equation using this cumulative total number of specimens to calculate the cumulative confidence level achieved at the end of successful testing of the selected test specimen in combination with all other test specimens of the driven component tested thus far.

Several other variations are possible in other aspects of this testing method. In one example, the plurality of driven components are defined by power train elements to be used in one or more wind turbine generators. More specifically, the power train elements include one or more of a main bearing, a generator and a gearbox. Each of these aspects and embodiments may be combined in any combination without departing from the scope of this disclosure.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

FIG. 7 is a schematic view of calculation software operating on a processor included in the reliability test system according to one embodiment of the invention, the calculation software including input formulas as applied during sequential testing of component samples.

FIG. 8 is a schematic view similar to FIG. 7 of the calculation software operating on the processor, with actual exemplary output values from the formulas being shown for illustrative purposes.

FIG. 10 is a schematic view of a calculation chart similar to those shown in FIGS. 7 and 8, but applied in the reliability testing method of another embodiment of the invention described in this application, this method involving some physical specimen testing as well as some virtual testing.

FIG. 20 is an exemplary calculation chart showing a generalized procedure for calculating a cost savings achieved by applying the reliability testing method of this invention as compared to conventional all-physical reliability testing, using the results of FIG. 19 as the example.

DETAILED DESCRIPTION

Figure 1:
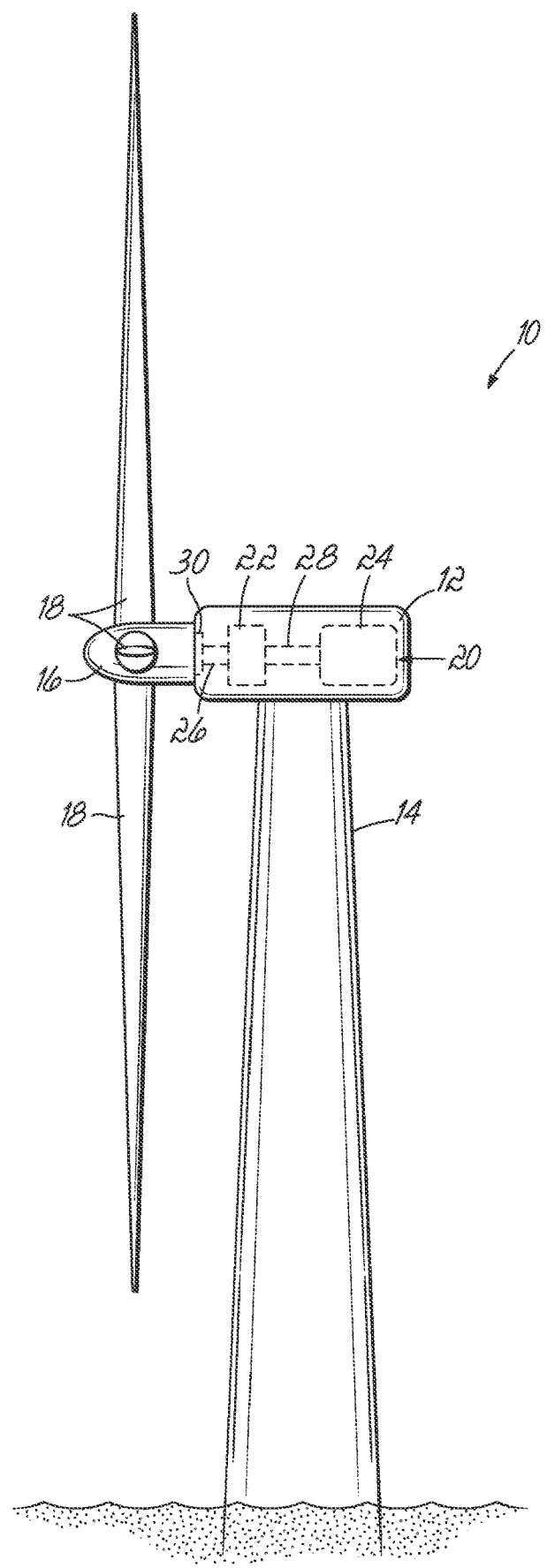
FIG. 1 is a schematic elevation side view of a horizontal-axis wind turbine (HAWT) generator, including power train components subject to the reliability testing methods of this invention, in one embodiment.

The invention described in the embodiments below includes a success run reliability testing method for demonstrating the reliability of driven components (for operating at a desired time duration or lifespan, or some other operational parameter) at a desired confidence level. More specifically, the reliability testing method described below incorporates both traditional physical testing of component samples as well as virtual testing of component samples, at least where products being tested are considered equal or similar, to arrive at the reliability result required by a customer. The virtual success run testing helps demonstrate the reliability of a product by assuming equal or similar test behavior as the component samples that are actually physically tested, e.g., the physical test results are applied in a way to the components to be "virtually tested." The combination of the physical testing, which occurs on a test bench arrangement, and the virtual testing, which does not require the test bench arrangement, enables for an overall reduction of the test duration and/or the component samples (e.g., the total costs) needed to produce the reliability result desired at a set confidence level. The cost and time savings can therefore reduce overall time needed to put a driven component product into full production and on the marketplace, in view of the improvements in efficiency at the reliability testing phase of projects. In other modified embodiments where different driven components are tested in parallel on a test bench, the calculation process used with the virtual testing remains useful in efficiently planning and evaluating the physical test results of the different products.

In some embodiments, the total number of component samples that require physical testing may be advantageously reduced by 50% when using physical and virtual testing in combination according to some of the embodiments of this invention. In other words, whereas an entirety of a plurality of test specimens would require physical testing in conventional methods, the invention described in this application enables physical testing of a first subset of test specimens and virtual testing of a second subset of test specimens. In other embodiments, the total time duration of physical tests can be reduced, such as by being based on the application of virtual testing to plan and evaluate the results of physical tests on a set number of test specimens. Just like with the first set of embodiments, the total costs for physical testing can be reduced as a result of the reduction in test duration, regardless of whether the number of test specimens is actually reduced. As such, increased efficiencies in the production of driven components in fields such as wind turbine power trains are enabled by use of the reliability testing method described herein, thereby helping to alleviate the burdens associated with the reliability testing which is demanded in this field to minimize unscheduled downtime.

Although wind turbine components are provided as the examples in the embodiments throughout this application, it will be understood that the driven component subject to reliability testing according to the method of this invention could be any type of mechanical driven component, without departing from the scope of this disclosure. To this end, wind turbine generators and the associated power train components are only one field in which the virtual and mechanical success run testing can be advantageous. Likewise, the methods herein for determining confidence level can be applied to other operational parameters beyond the examples of time duration and reliability in the examples provided herein, without departing from the scope of this disclosure.

Before explaining specifics of the reliability testing method, the types of components which are beneficially subjected to such a method are described in connection with FIG. 1. To this end, FIG. 1 shows a schematic view of an exemplary wind turbine 10 of the horizontal-axis wind turbine (HAWT) type, which includes a nacelle 12 mounted on top of a tower 14, with the tower 14 being mounted on a foundation or footing. The nacelle 12 includes a hub 16 at its front end that carries a plurality of rotor blades 18. Three rotor blades 18 are shown in this embodiment, as is common with large utility-scale generators, however, persons skilled in the art would appreciate that other numbers of rotor blades 18 may also be suitable. Moreover, other tower constructions are also envisioned, for example, a tower 14 defined by a structural lattice framework.

Although many of the individual components are not shown in the figures for clarity, the nacelle 12 shown in FIG. 1 contains a generator set 20 (including a gearbox 22 and a generator 24), a low speed drive shaft 26, and a high speed output shaft 28 (all of which are shown using dashed lines). The nacelle 12 also typically encloses a main hub bearing 30 (shown in phantom lines) located adjacent the low speed drive shaft 26 and supporting the various loads applied during rotation of the hub 16 into the remaining structure of the nacelle 12 and the HAWT 10. The generator set 20 enables energy to be recovered from the rotor blades 18, and is driven by the hub 16 through the low speed drive shaft 26.

The generator set 20 is typical of a HAWT 10, with the gearbox 22 stepping up the rotational speed of the low speed drive shaft 26 to the high speed output shaft 28 that ultimately drives the generator 24. The generator 24 outputs alternating current (AC) at a voltage and frequency that is determined largely by the rotational speed of the hub 16, as driven by the rotor blades 18. It will be understood that the AC output from the generator 24 may be converted by a known power system (not shown) associated with the HAWT to direct current (DC) power and possibly back to AC power before being delivered to a national power grid system via a supply line. Thus, the HAWT 10 is configured to transfer wind energy into AC or DC power output, in accordance with a normal operation.

Figure 2:
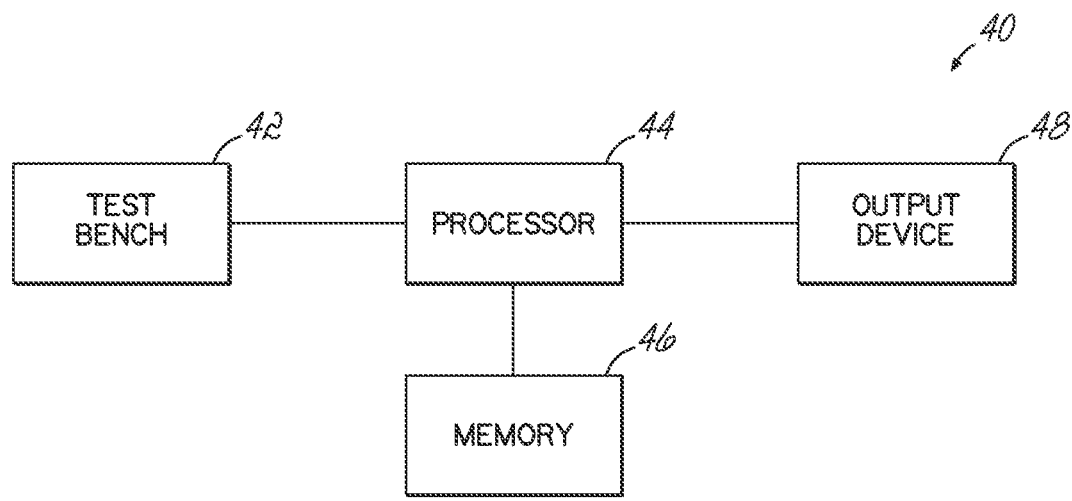
FIG. 2 is a schematic diagram illustrating components of a reliability testing system according to one embodiment.

Having described the overall structure of the wind turbine 10, discussion will now turn to the reliability test system 40 used to perform the methods described in further detail below. With specific reference to the schematic "black box" illustration of FIG. 2, the test system 40 in accordance with one embodiment includes a test bench 42 configured to perform physical testing of wind turbine component samples, most typically power train components like the gearbox 22, the generator or the main hub bearing 30. The test bench 42 is further described with reference to FIG. 3 below. The test system 40 also includes a computer processor 44 operatively coupled to the test bench 42 so as to receive data from sensors thereon, for example. The processor 44 is connected with a memory 46 which is capable of storing the algorithms and calculations necessary for the processor 44 to implement when performing virtual testing based on the physical testing at the test bench 42. In this regard, the processor 44 is a known computing device capable of executing functions and software in accordance with the methods as described below.

The processor 44 also operatively connects with an output device 48 such as a display panel or other audio/visual device which is capable of providing reliability test results in graphical or other formats to users of the reliability testing method. Those results can then be shared with customers who intend to purchase similar or equivalent components to those being tested for reliability. The reliability test system 40 may include additional elements in other embodiments without departing from the scope of this disclosure.

Figure 3:
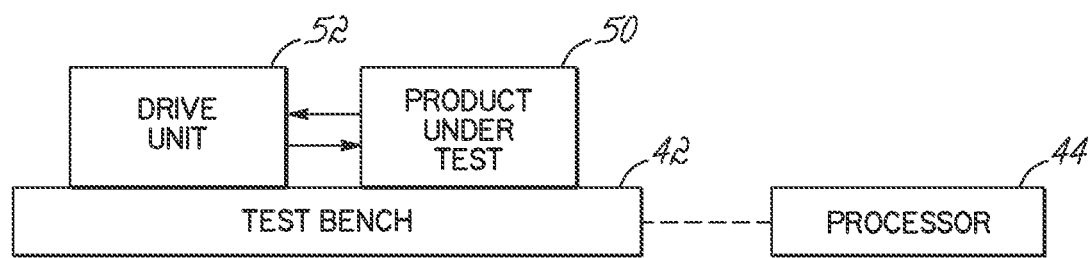
FIG. 3 is a schematic diagram of the test bench used for physical reliability testing in the reliability testing system of FIG. 2.

Now with reference to FIG. 3, the test bench 42 is shown in further detail. The test bench 42 includes a location for mounting a component sample 50 (labeled "Product Under Test" in FIG. 3), such as a gearbox 22, a generator 24 or main hub bearing 30, and a drive unit 52. The drive unit 52 is controlled by software or a processor included internally in the test bench 42 itself, or from control signals communicated by the aforementioned processor 44 of the test system 40 in other embodiments. Regardless of how the drive unit 52 receives actuation signals, the drive unit 52 is configured to operate the component sample 50 for a predetermined test duration time period in order to evaluate whether that component sample 50 will fail (e.g., success run type testing). The drive unit 52 is capable of applying different loadings (e.g., accelerated loadings) to the component sample 50 so as to simulate the real-world environmental and operating conditions which will likely be encountered by the similar or equivalent components being sold to customers. One of ordinary skill in reliability testing will understand the functionality and operation of the test bench 42 and drive unit 52, as these are conventional equipment currently used in physical reliability testing methods.

The reliability testing methods used by the original assignee of the invention described herein are based on success run testing, which was initially described in general terms above. The success run theory for reliability testing is governed by a primary equation as follows:

$$\text{Success Run equation: } C = 1 - R(t)^N \Leftrightarrow N = \frac{\ln(1-C)}{\ln(R)}$$

$R(t)$ = reliability, time dependent $C$ = confidence level $N$ = test specimens Thus, reliability, confidence level, and the number of component samples are dependent upon each other when performing success run testing. In typical testing circumstances, desired goals for confidence level and reliability are provided, such as by a customer in the wind turbine setting. From these numbers, the primary success run equation listed above can be used to calculate how many component samples are necessary. One example for the sake of clarity is provided below, with a desired 50% confidence level and a desired 90% reliability for 10 hours of operation:

$$\text{Given} \begin{cases} R(10 \text{ hours}) = 90\% \\ C = 50\% \end{cases}$$

$$C = 1 - R(t)^N \Leftrightarrow N = \frac{\ln(1-C)}{\ln(R)} = \frac{\ln(1-0.5)}{\ln(0.9)} \cong 7 \text{ test specimens}$$

Rather than setting a certain test duration and calculating how many component samples need to be tested at that test duration to reach reliability and confidence levels desired, e.g., 7 component samples in the example calculation above, it may be desired to test only a set number of component samples for a longer time period. For instance, the original assignee of this application typically prefers to run tests on up to 2 specimens or component samples. Accordingly, under the well-understood theories governing success run testing, a necessary test duration for each of the component samples can be determined using the following formula (the confidence level C is assumed to be the same for both cases and the Weibull distribution is applied with parameters b and T to model the expected failure of component samples):

$$\begin{cases} C = 1 - R(t_s)^{N_s} \\ C = 1 - R(t_n)^{N_n} \end{cases} \Leftrightarrow 1 - R(t_s)^{N_s} =$$

$$1 - R(t_n)^{N_n} \Leftrightarrow R(t_s)^{N_s} = R(t_n)^{N_n} \Leftrightarrow \ln[R(t_s)^{N_s}] =$$

$$\ln[R(t_n)^{N_n}] \Leftrightarrow N_s \ln R(t_s) = N_n \ln R(t_n) \Leftrightarrow \frac{\ln R(t_s)}{\ln R(t_n)} = \frac{N_n}{N_s}$$

$$\begin{cases} \frac{\ln R(t_s)}{\ln R(t_n)} = \frac{N_n}{N_s} \\ \text{Weibull distribution } R(t) = e^{-\left(\frac{t}{T}\right)^b} \end{cases} \Leftrightarrow \frac{\ln\left[e^{-\left(\frac{t_s}{T}\right)^b}\right]}{\ln\left[e^{-\left(\frac{t_n}{T}\right)^b}\right]} = \frac{N_n}{N_s} \Leftrightarrow \frac{\left[-\left(\frac{t_s}{T}\right)^b\right]}{\left[-\left(\frac{t_n}{T}\right)^b\right]} =$$

$$\frac{N_n}{N_s} \Leftrightarrow \Leftrightarrow \left(\frac{t_s}{t_n}\right)^b = \frac{N_n}{N_s} \text{ (Lipson equation)}$$

where:

$t_s$: original test duration $t_n$: modified test duration $N_s$: total specimens in test exposed to original duration $t_s$ $N_n$: total specimens in test exposed to modified duration $T_n$ This so-called "Lipson equation" then governs the relationship between the number of component samples and test duration under a normal success run testing arrangement (e.g., where the test duration is specified) and the number of component samples and test duration in the alternative success run testing arrangement (e.g., where the number of component samples is specified). To illustrate the use of this concept in more detail, the example above is applied again below where the confidence level of 50% and a reliability of 90% with a 10 hour operation duration would normally necessitate the use of 7 component samples. If only 2 component samples are to be used for the success run testing, the new test duration can be calculated using the Lipson equation as follows:

$$t_n = t_s \left(\frac{N_s}{N_n}\right)^{\frac{1}{b}} = 10 \text{ hours} \left(\frac{7 \text{ specimens}}{2 \text{ specimens}}\right)^{\frac{1}{1.5}} \cong 23 \text{ hours}$$

Thus, in order to achieve the same determination of 90% reliability with a confidence level of 50%, 2 component samples would need to be run for 23 hours without failure on the test bench 42. As will be readily understood, when the number of component samples to be tested is made a very low number such as 2, the test duration tends to increase significantly, especially at higher levels of confidence and reliability than those in the example calculations herein. In this regard, the test bench 42 may need to be used for long periods of time to achieve the reliability testing results required by customers for wind turbine components, and that clarifies the desirability of reducing how much physical testing of component samples is needed. For example, removing a substantial portion of the physical testing (measured in total time duration of tests) that is necessary can make reliability testing procedures more cost and time efficient, particularly in environments where test system resources are limited. Therefore, the combination of virtual component testing with the conventional physical component testing is advantageous in the success run reliability testing methods of this disclosure.

Figure 4:
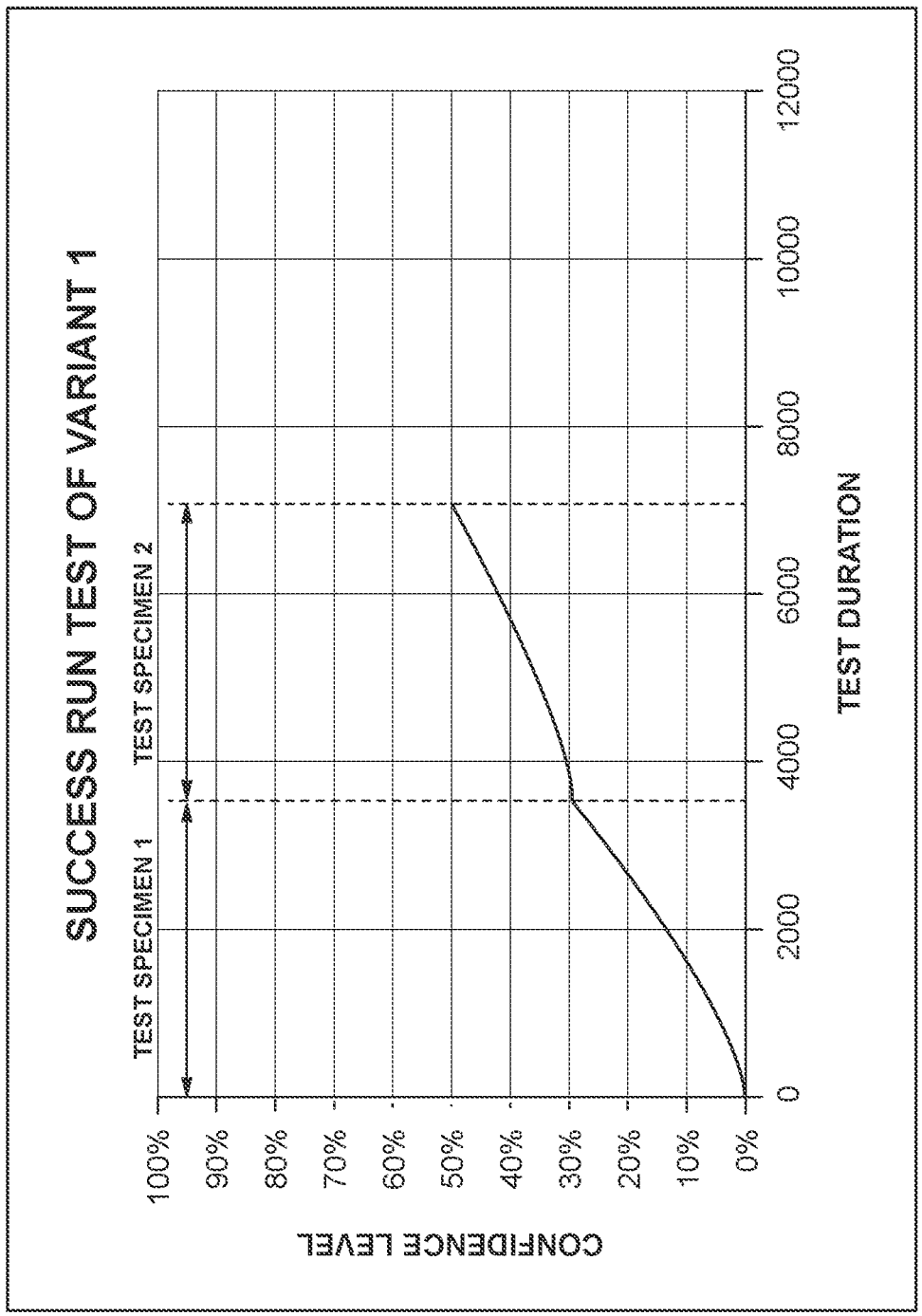
FIG. 4 is a graphical plot showing confidence level test results for physical testing of two component samples according to a first product variant, the plot determined by well-established success run testing equations.
Figure 5:
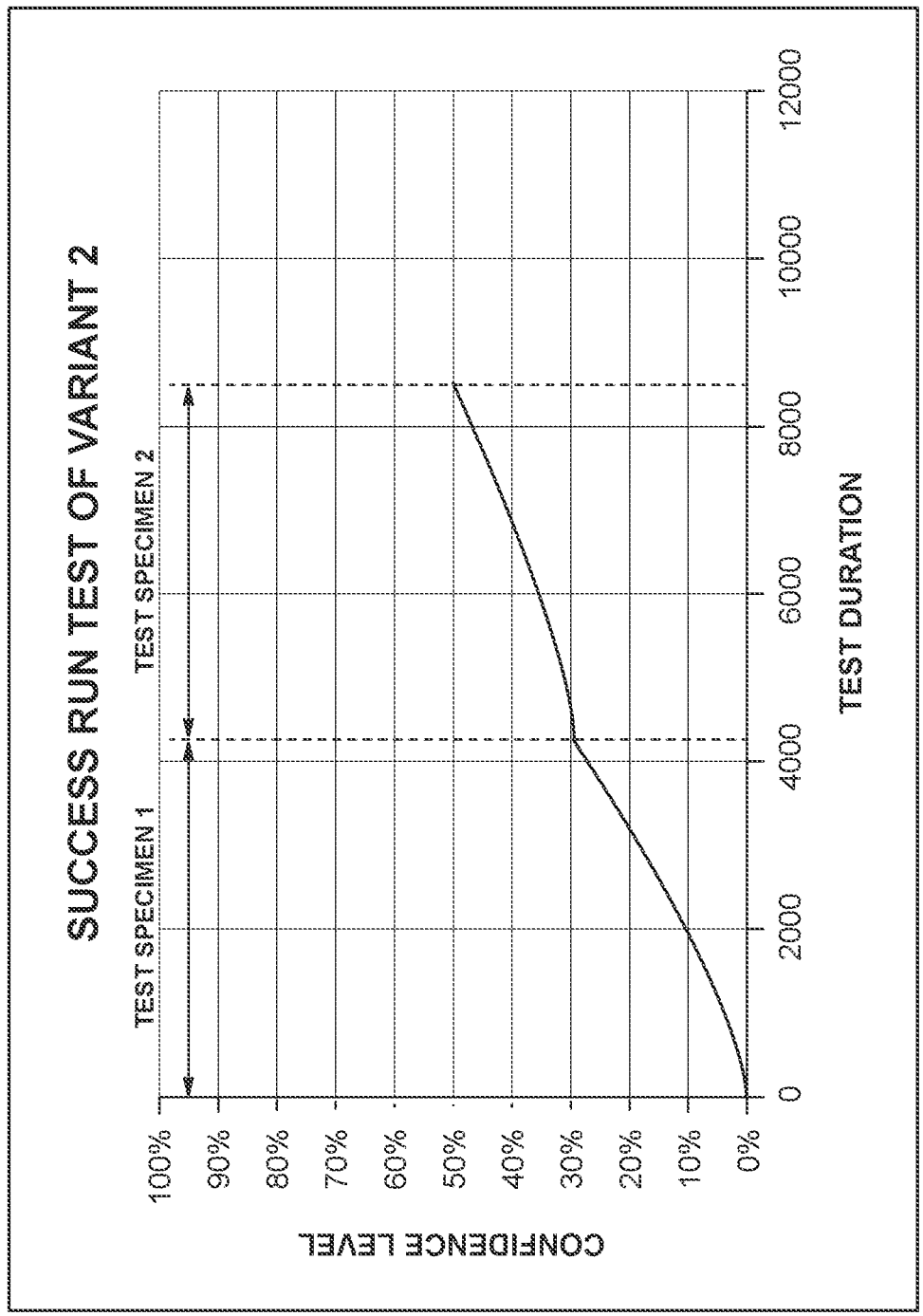
FIG. 5 is a graphical plot similar to FIG. 4, but showing confidence level test results for physical testing of two component samples according to a second product variant, this second product variant behaving similarly in physical testing on a test bench to the first product variant.

Turning to FIGS. 4 and 5, a schematic plot of physical testing of component samples according to two different variants of products are shown, these plots and the description below being tailored to explain the general process for reliability testing, which is also applied with the physical and virtual combined testing process described in further detail below. Beginning with FIG. 4, the test results show that the first "test specimen" or component sample is tested for a period of time, with the successful running of that sample (e.g., without product failure) causing the confidence level that the component will not fail in real world use up to about 30% (the time numbers along the time axis are approximated). The second component sample is then tested in sequence after the completion of the testing of the first component sample, again for a similar period of time. The successful running of that sample without product failure causes the confidence level to rise up to about 50%, which was the desired value in the example provided throughout this application. The specific sloping of the segments between the end points of the test runs in these Figures should not be considered limiting as the confidence level can vary in different ways between the end points calculated (30% and 50% in this example).

The end points or confidence level that results from the physical testing of each component sample can be determined using the formulas provided above. To this end, assume again that a reliability of 90% for 10 hours of operation of a component is desired with a confidence level of at least 50%. As calculated above, that would normally require 7 component samples to be tested successfully for 10 hours apiece to comply with the success run equation. With only two component samples being used as shown in the plot of FIG. 4, the test duration is modified and calculated by the Lipson equation as shown above to be 23 hours for each of the two component samples. These same formulas can then be re-used to evaluate what the confidence level achieved is after only one of the component samples has been tested. For reference, the following set of formulas and variables are used:

$R(T_s)$ = reliability, time dependent $C$ = confidence level $N_s$ = test specimens given by $N_s = \dfrac{\ln(1-C)}{\ln(R)}$ $N_n$ = test specimens avaliable $T_n$ = test duration of each specimen $c_j = 1 - R(t)^{n_{sj}}$ $n_{sj} = n_{nj}\left(\dfrac{t_{nj}}{T_s}\right)^b$ $n_{nj} = 1$ As shown at the bottom of these formulas, the lowercase notation "j" refers to which component sample is being tested. Thus, when calculating the confidence for the first component sample $c_1$, the number of actual tested samples $n_{n1}$ is set to 1 as shown. The Lipson equation is then used to calculate $n_{s1}$, which is the variable needed to complete the confidence level calculation according to the success run primary equation. In the example referred to above, $n_{n1}$ is set to 1, $t_{n1}$ is set to 23 hours because that is the actual test duration, $T_s$ is set to 10 hours because that is the period of running time being tested for, and b is set to 1.5 as known in the art of reliability testing. Using those values, the $n_{s1}$ comes out to about 3.488. That number can be plugged in with the reliability of 90% into the success run primary equation to result in the confidence level, which is calculated in this example to be about 0.308, also known as about 30.8%. Thus, by performing these calculations, it is known that the confidence level reached at the end of physical testing the first component sample is just over 30%. That is reflected in the plot shown in FIG. 4. The same calculations could then be run with $n_{nj}$ being set equal to 2, which results in a confidence level of about 50% (52% to be more precise, the difference from 50% being caused by rounding of the hours and test durations needed in the initial set of calculations above). Thus, on the plot shown in FIG. 4, at the end of the physical testing of the second component sample, the confidence level reaches about 50%. These formulas can be used in a similar fashion to form plots of confidence level rising over time in any number of different physical testing setups and arrangements, including this sequential testing arrangement described in the example of FIGS. 4 and 5.

FIG. 5 shows a variant of the product tested in FIG. 4, this variant being subject to a different acceleration factor. In reliability testing, the acceleration factor is defined as the ratio between the field and test bench mean lifetimes. This can be related to the total lifetime under field loads and under accelerated loads by applying the 63% mean lifetime ("T") of the Weibull distribution as shown in the following series of formulas:

$$AF = \dfrac{\overline{t_f}}{\overline{t_a}} \equiv \dfrac{\text{mean lifetime under field loads}}{\text{mean lifetime under accelerated loads}}$$

$$\text{Weibull: } F(t) = 1 - e^{-\left(\frac{t}{T}\right)^b} \Leftrightarrow T = -\dfrac{t}{[\ln(1-F)]^{\frac{1}{b}}}$$

$$AF = \dfrac{\overline{t_f}}{\overline{t_a}} = \dfrac{-\dfrac{t_f}{[\ln(1-0.63)]^{\frac{1}{b}}}}{-\dfrac{t_a}{[\ln(1-0.63)]^{\frac{1}{b}}}} = \dfrac{t_f}{t_a} \Leftrightarrow AF = \dfrac{\overline{t_f}}{\overline{t_a}} = \dfrac{t_f}{t_a},$$

for $t_f$ and $t_a$ at same $F$ $$AF = \dfrac{t_f}{t_a} \equiv \dfrac{\text{lifetime under field loads}}{\text{lifetime under accelerated loads}}$$

Therefore, the duration of a test of a component sample under accelerated test bench conditions (labeled as $t_a$ throughout this document) is directly correlated by this ratio to the expected successful lifetime (labeled as $t_f$ throughout this document) of the same component in the field. These calculations can use distributions other than Weibull, but the end result remains the same for calculating or defining the acceleration factor. Moreover, the acceleration factor AF can be calculated in alternative methods, such as by using empirical models for given failure probabilities, as well understood in the reliability testing art. The important take away from this definition of the acceleration factor is that the product variant of FIG. 5 requires longer testing periods for test specimens 1 and 2 to reach the same confidence level points compared to the variant tested in FIG. 4. It is then concluded from the formulas provided above that the second variant tested in FIG. 5 is subject to a lower acceleration factor AF than the first variant in FIG. 4, and this accounts for the longer test durations under accelerated loads on the test bench (to result in the same desired lifetime under field loads for both variants). Nevertheless, in all other respects, the tests and the results achieved are the same with the two product variants subjected to the typical physical testing process.

As will be set forth in further detail below, the different product variants shown with physical testing in FIGS. 4 and 5 are just one type of product variants which can use the advantageous virtual reliability testing of the presently-described invention. In this regard, the two variants have been proven to behave similarly in the same test, e.g., using the same loads and test durations. Consequently, only one sample of each of the two variants needs to be physically tested while the other component sample can be virtually tested based on the results of the physical test of the other variant in the same time period, in accordance with the process described further below.

Figure 6:
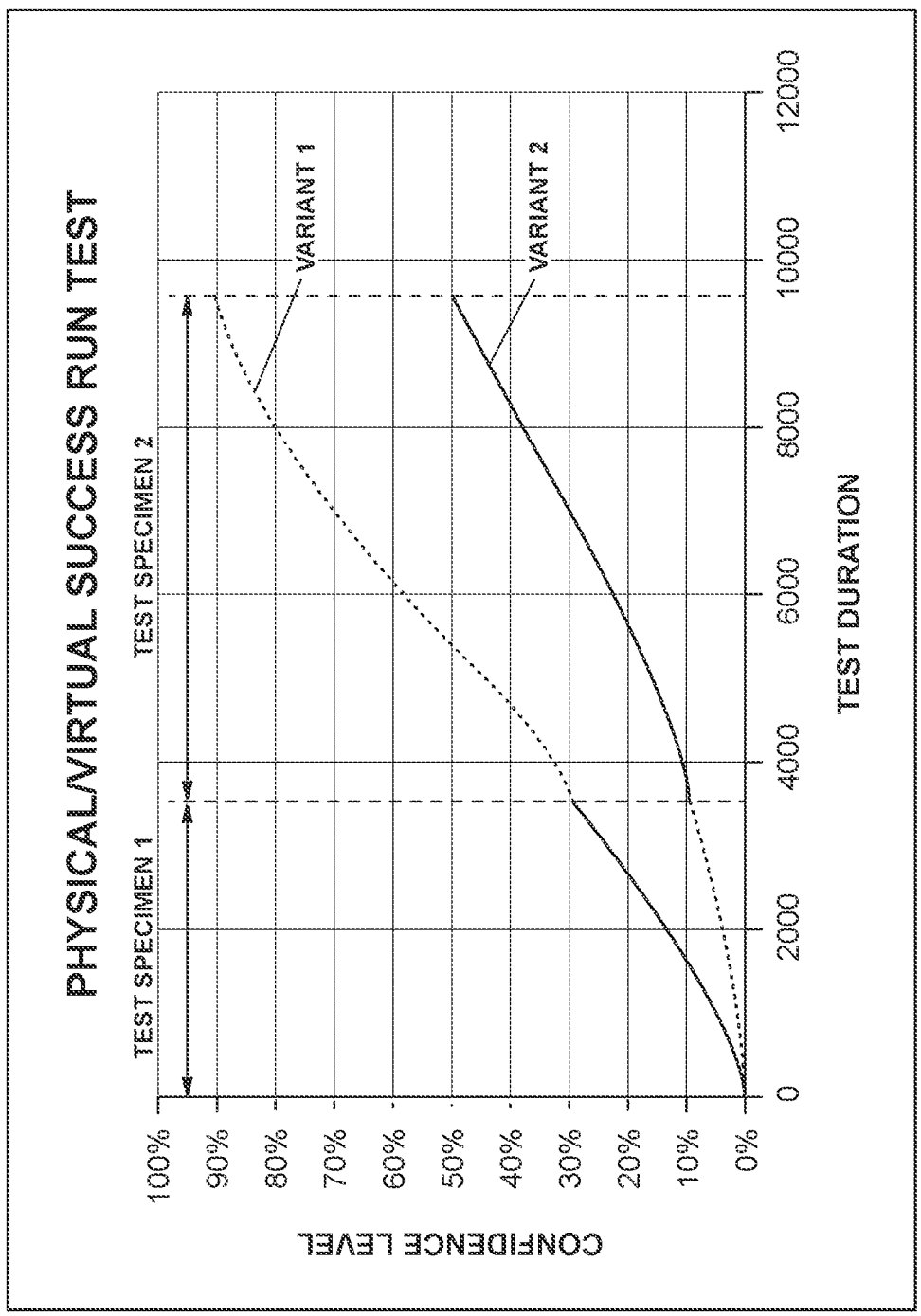
FIG. 6 is a graphical plot similar to FIGS. 4 and 5, but showing application of the reliability testing method of the invention described in this application, which specifically applies physical testing on a test bench and virtual testing of component samples to achieve reliability results of the first and second product variants, the physical and virtual testing being simultaneous in one aspect.

FIG. 6 illustrates a first example of results generated by the reliability testing process of this invention, which is the combination of physical test bench testing and virtual component sample testing as set forth in this disclosure. To this end, the two product variants are now illustrated on the same confidence level plot, with the solid line portions being results from physical testing and the dashed line portions being results from simultaneous virtual testing. Although the variants shown in FIGS. 4 through 6 are similar products subject to the same or different loads in use (thereby defining different acceleration factors), it will be appreciated that the variants could also be two equivalent products subjected to different loads in field use, which of course would normally require two distinct sets of physical testing. The calculation process works the same way in such an embodiment, so a separate set of graphs and explanation are not provided herein of those types of "product variants."

To briefly summarize, the same set of calculations may be done as set forth above to evaluate the test duration $t_{n1}$ to be used and what confidence level is achieved by physically testing only one component sample from the first variant over that test duration. Assuming the component sample of the first variant successfully survives operation at test bench loads for the full test duration, that solid line portion of the plot in FIG. 6 can be provided. Similar calculations can then be independently done with the same test duration as the physical test, but with application of the different acceleration factor of the second product variant, to determine the confidence level that would be reached by a similar successful test (if done physically) of the second product variant over the same test duration. As a result of the different acceleration factors, the confidence level reached by the second product variant in such a virtual test is shown to be less than the confidence level of the first product variant. The lower confidence level result is shown by the dashed-line plot of the second variant under the test specimen 1 heading in FIG. 6. This specific confidence level value from the virtual test shown in phantom for "test specimen 1, variant 2" then becomes the starting point for the next round of testing on the second component samples for each variant.

More specifically, the goal remains to achieve the 50% confidence level for the reliability and actual operation time being tested for both product variants. For the second component samples or "test specimens" as set forth in FIG. 6, the second product variant is now the only one to be physically tested. Using the same success run primary equation and Lipson equation as before, the necessary test duration can be determined to lift the confidence level from the amount reached in the virtual testing of the first component sample of variant 2 to the 50% goal. The second component sample of the second variant is then physically tested on the test bench for that necessary test duration, and if the run is successful, then the solid-line plot shown in FIG. 6 for "test specimen 2, variant 2" can be added to the graph of results.

Similar to the process described above, the second component sample for the first product variant can then be virtually tested by applying the same formulas with the test duration just used for the physical test of the second component sample of variant 2 in order to determine what confidence level would be achieved by a successful physical test of the first variant using the same parameters as used for variant 2. As the first variant started at a much higher confidence level at the end of the first component sample testing, and in view of the acceleration factor differences between the variants, the calculations from the virtual testing will result in a confidence level achieved of much higher than 50% (approximately 90% in the FIG. 6 example). Again, the virtual testing can be performed in these circumstances because these two product variants do not behave differently when tested physically on the test bench, so there is no need to confirm the result with duplicative physical testing of the first variant when the second variant is confirmed to be successful over the necessary test duration for component sample 2. To summarize, the reliability testing process according to the presently-described invention continues to achieve confidence level results of the desired level (50% or more in this example) for each product variant while reducing the total number of component samples which need to be physically tested as follows:

Theoretical saving potential $(TSP) =$ $$TSP = 1 - \frac{\text{physical specimens } acc. \text{ Virtual Dragon}}{\text{physical specimens } acc. \text{ Classical Dragon}}$$

$$TSP = 1 - \frac{2 \text{ physical tests}}{2\frac{\text{tests}}{\text{variant}} \times 2 \text{ variants}} = 1 - 0.5 = 50\%$$

Note that the term "Dragon" is an internal term of the Applicant which is used as a shorthand for "success run reliability testing" in these equations. This "theoretical saving potential" is also identified as a cost saving ratio in further examples below where the total costs are reduced by reduction of physical test bench time, in addition to or alternatively to the reduction of test specimens as resulted in this example. As noted above, even though this simplified example provides about 50% reduction of costs, more or less cost savings can be achieved by other embodiments of the reliability testing methods of the currently-described invention.

The same advantageous process can also be used when two different load sets would need to be tested as applied to an identical product. Normally this would require two component samples to be tested under each of the different load sets, but under the process using virtual reliability testing, only one component sample needs to be tested physically under each of the different load sets, while the other samples are tested virtually based on the physical test results. Additional steps for conducting such virtual tests are described below, but the end result is reducing the physical testing time and samples necessary, while still achieving the same results as the prior reliability tests using solely physical test bench results.

Before turning to such further examples and embodiments, it will be helpful to describe formulas that define the cost savings achieved by many of the embodiments of the methods described throughout this disclosure. One example of such a savings was defined as the "theoretical savings potential" above, but the calculation may be generalized for all contexts where costs are saved by comparing the total costs of physical testing that would be done in a conventional or "classical" success run testing method, with the total costs of physical and virtual testing that would be done when applying the reliability testing methods of this invention. Again, note that the term "Dragon" is an internal term of the Applicant which is used as a shorthand for "success run reliability testing" in the following equations (e.g., Classical Dragon is conventional success run testing). First, a total costs saved in actual dollars or other currency may be obtained by the following calculation:

Costs saved by Virtual Dragon=(costs associated with testing all variants and specimens acc. Classical Dragon)−(costs associated with testing all variants and specimens acc. Virtual Dragon)

Another way to view the benefits of the reliability testing methods of the present invention is to view the costs saved in terms of a percentage reduction in costs, which is referred to as a "Cost saving ratio" in the following formula. This calculation is repeated below for several examples and is also consistent with the "theoretical saving potential" calculated above:

$$\text{Costs saving ratio} = \frac{\text{Costs saved by Virtual Dragon}}{\text{Costs associated with testing acc. Classical Dragon}} = 1 - \frac{\text{Costs associated with testing acc. Virtual Dragon}}{\text{Costs associated with testing acc. Classical Dragon}}$$

Thus, in a hypothetical example of how this cost saving ratio would be used, assume that the classical or conventional success run testing for 4 different product variants would require 8 total tests of physical test specimens on the test bench, e.g., 2 specimens per product variant. The costs associated with those classical tests would include those involved with the 8 specimens themselves as well as those involved in the testing process itself. The costs associated with the testing could include any or all of acquisition of the test specimens and any required auxiliary equipment, specimen preparation and installation of sensors and the like, execution of test sequences over running times with inspections, analysis, etc., and troubleshooting related activities as well as post-processing and reporting of results. If the physical and virtual reliability testing methods of the invention described herein are used instead, assume that the requirement for physical testing on the test bench can be reduced to one test specimen per variant, consistent with the first example provided above. As such, the costs for performing the reliability testing include only costs of producing 4 test specimens as well as the costs involved with conducting the 4 tests on the test bench. If a further simplification is assumed costs for conducting each test is equal, the calculation of the cost saving ratio would be as follows:

$$\text{Costs saving ratio} = 1 - \frac{4 \text{ specimens} + \text{costs of 4 tests}}{2 \frac{\text{specimens}}{\text{variant}} \times 4 \text{ variants} + \text{costs of 8 tests}} = 50\%$$

Therefore, the cost saving ratio accurately provides an explanation of one of the benefits of the reliability testing methods of the invention described in this disclosure, regardless of whether the savings is generated from use of fewer specimens, reduced test durations, or some combination thereof. This calculation will be referred to again throughout the examples and embodiments provided below to help confirm the differences of the invention described herein from conventional success run testing, which suffers from at least the drawbacks described in the Background section above.

Figure 9:
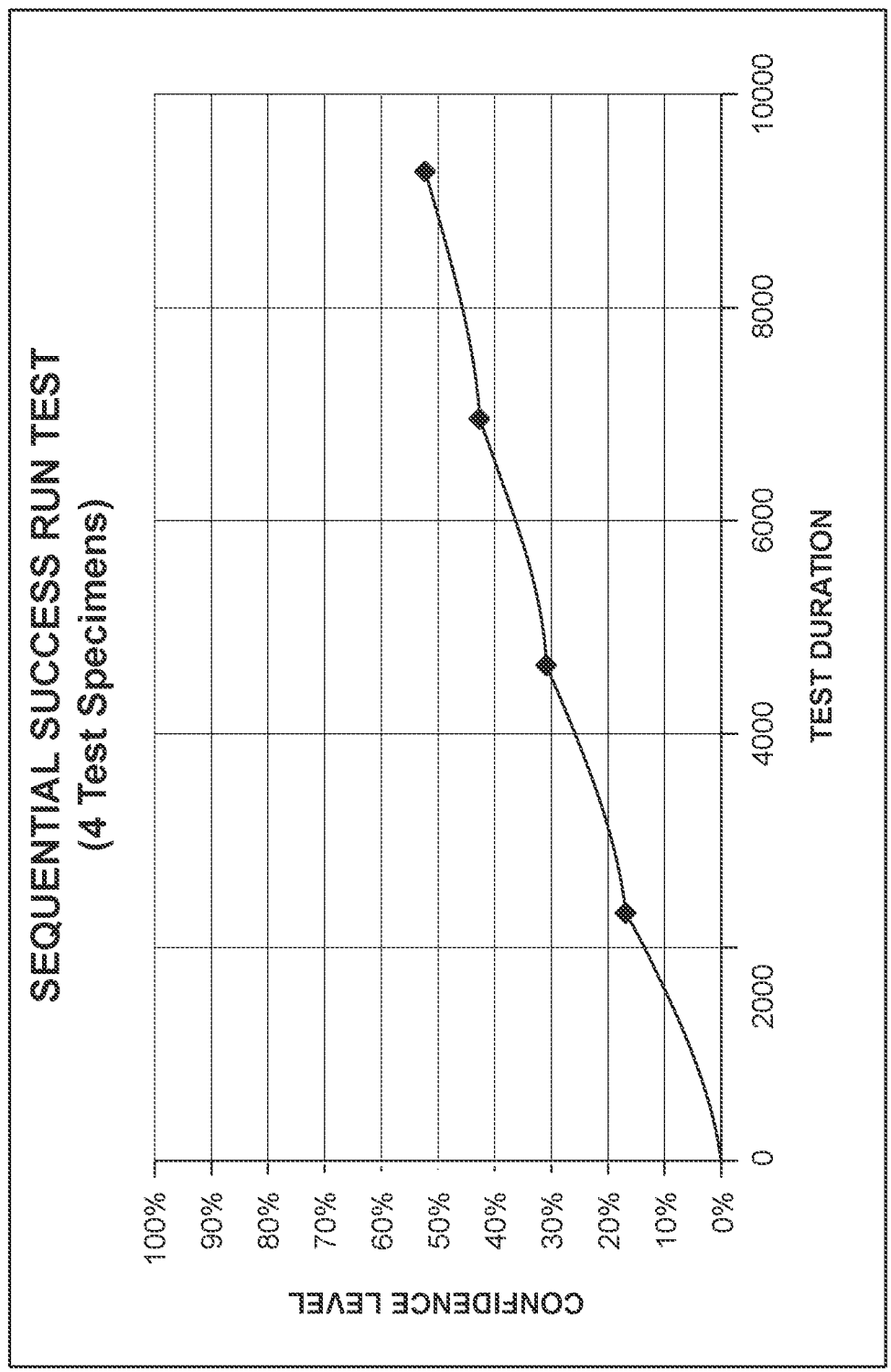
FIG. 9 is a graphical plot similar to FIGS. 4 and 5, but showing confidence level test results for physical testing of four component samples tested in a sequential manner rather than simultaneously, consistent with the calculations shown in FIGS. 7 and 8.

Another example applying the reliability testing methods for sequential testing of several component samples is provided with reference to FIGS. 7 through 9, with additional emphasis on the calculation process which also defines the foundation of the reliability testing process of this invention. More specifically, this example and the following discussion clarifies the difference between equations used for individual component samples and the equations used for combining specimens in a sequential process, which becomes important when moving from one component sample to the next in the methods described herein. FIGS. 7 and 8 illustrate screenshots of the input (at FIG. 7) provided to a software program executed by the processor 44 in the test system 40, and the calculation outputs (at FIG. 8) resulting from these calculations. The display shown in these Figures is a schematic of what would be viewed on the output device 48 of the test system 40 as set forth above, such as when the output device 48 is a computer monitor or screen. A further explanation of the formulas and the variables shown in these Figures is now provided.

Each individual segment of the testing curve, which is produced on the graphical plots shown throughout the Figure set of this application, is produced from a set of underlying formulas that have been previously described. In these formulas, the calculated variables are referred to as non-cumulative and are represented by lowercase variables with the index or subscript of "j" (referring to the specific component sample). The uppercase variables without the "j" index are constants defined by the reliability goal, and for the sake of this example, are similar to the values provided in other examples above. That set of formulas can now be summarized as follows:

$R(T_s) = $ reliability, time dependent $C = $ confidence level $N_s = $ test specimens given by $N_s = \frac{\ln(1-C)}{\ln(R)}$ $N_n = $ test specimens avaliable $T_n = $ test duration of each specimen $c_j = 1 - R(t)^{n_{sj}}$ $n_{sj} = n_{nj} \left(\frac{t_{nj}}{T_s}\right)^b$ $n_{nj} = 1$ These formulas are applied as shown most clearly by the equations input into the software and shown in FIG. 7. Thus, the process begins with a determination of the number of component samples $N_s$ which would normally be necessary if each component sample or "test specimen" were physically tested in success run testing for the same duration as is being tested for in the reliability analysis. This depends on the predetermined values of the constants, specifically the reliability number, shown to be 90% in the example of FIGS. 7 and 8, and the confidence level, shown to be 50% in FIGS. 7 and 8. The formula for $N_s$ shown above is visible in block F6 of the FIG. 7 chart, and in the present illustrative example, that calculation comes out to 7 specimens in the results shown in FIG. 8. Therefore, to achieve reliability of 90% for a running time $T_s$ of 10 hours with a confidence level of 50%, the normal success run testing would involve physically testing 7 component samples for the same 10 hour time period.

However, fewer component samples are actually provided for testing than this number. In this new example, the test specimens available for the sequential testing are 4, and the Lipson equation can be applied to calculate the appropriate test duration $T_n$ for each of those 4 component samples as shown at block F12 of FIG. 7. At FIG. 8, the result of that calculation of the processor 44 is shown to be 14.5 hours in this example. In this regard, to achieve the same reliability of 90% for a running time $T_s$ of 10 hours with a confidence level of 50% with only 4 component samples, each of the component samples needs to be successfully tested for a 14.5 hour test duration. This value can then be plugged in as the $t_n$ for each of the individual component samples in Column F of the calculation chart shown in FIG. 7.

At this point, the bottom three formulas provided for calculating the $n_{nj}$, the $n_{sj}$, and the $c_j$ are applied for each of the four component samples in the non-cumulative part of the chart. As each component sample is calculated individually in this case, the $n_{nj}$ is always set to be 1 because this set of calculations assumes only 1 component sample being tested. Using the $t_n$ values determined above and the Lipson equation as shown in the blocks G22 through G25 in FIG. 7, the $n_s$ values for each of the j=4 component samples is calculated, and this comes out to about 1.746 (1.75) as shown in the results provided in FIG. 8. That $n_s$ value is then run through the success run primary equation as shown in the blocks 122 through 125 in FIG. 7 to provide what the confidence level achieved would be for each component sample when taken individually. As shown in FIG. 8, this confidence level is about 16.8%, which is shown as 0.17 in FIG. 8 for each of the four component samples.

While this set of calculations results in valuable information for the individual test specimens, the fact that the test specimens are actually tested sequentially must also be considered when determining the total confidence level achieved by the sequential testing process. Therefore, further equations for combining specimens in this manner are shown in use in FIGS. 7 and 8 under the heading cumulative:

$$C_j = 1 - R(t)^{N_{sj}}$$

$$N_{sj} = \sum_{k=1}^{j} n_{sk}$$

For these cumulative values, uppercase letters are used for the variables again with the index or subscript of "j" to refer to which component sample is being applied. As shown in Column M of FIG. 7, the calculation for $N_{sj}$ is a relatively simple sum for all of the $n_{sj}$ for the component samples tested to date (e.g., about 0.175 for the first component sample, about 0.175 times two for the second component sample, and so on). The $n_{sj}$ values for the individual component samples therefore must be calculated in order to generate these $N_{sj}$ values for the cumulative testing of the sequential process. After calculating such values, the $N_{sj}$ numbers can be plugged into the success run primary equation as shown in Column O of the chart in FIG. 7 to arrive at the confidence level achieved at the end of each sequential test specimen or component sample. The result of such calculations is shown in Column O of FIG. 8. These cumulative $C_j$ values are what would be plotted as segment endpoints for a graphical plot of confidence level changes over test duration time. Such a plot using the values in this example of FIGS. 7 and 8 is provided at FIG. 9, for reference. As expected by the original calculation of the test duration necessary for testing 4 component samples and arriving at 50% or more confidence level, this series of physical success run tests and calculations confirm that the desired confidence level is achieved by the end of the fourth component sample test. Indeed, a similar set of equations and calculations can be used in a calculation chart operated by software loaded on the processor 44 to execute the reliability testing method on a number of similar product variants (instead of just one product variant as in FIGS. 7 through 9), this specific process now being described in further detail.

Figure 11:
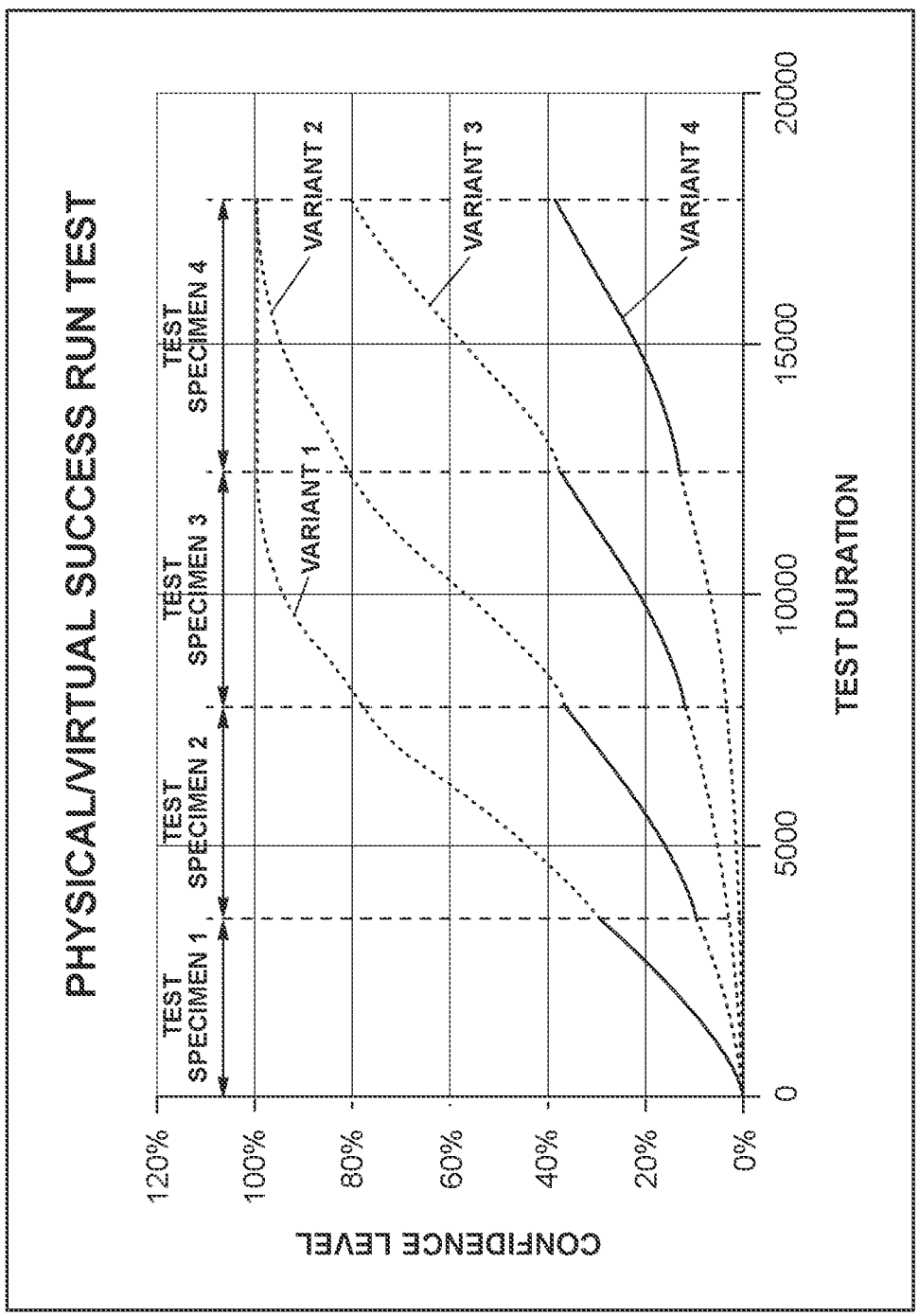
FIG. 11 is a graphical plot similar to FIG. 6, but showing confidence level test results for physical and virtual testing conducted on four product variants according to the reliability test method of the embodiment shown in FIG. 10.

Now turning with reference to FIGS. 10 and 11, success run reliability testing using the combination of physical test results and virtual test results is shown in accordance with one embodiment of the presently-described invention. Beginning with FIG. 10, a calculation chart produced by software executed by the processor 44 of the test system 40 is shown, in a manner similar to how that calculation chart would appear on the output device 48. The calculation chart includes an identification of the type of product variant with index or subscript "i" and the number of test specimen with index or subscript "j." The number of test specimens available $n_n$ (typically set to 1 because each line represents only one of the component samples), the other non-cumulative variables $t_n$, $n_s$, and c, and the cumulative variables $N_s$ and C are shown in a similar manner as in the previous example in FIGS. 7 and 8. Each of these items can be further labeled with the subscripts of the product variant "i" and the specimen number "j" as shown in the shorthand versions in each block of the calculation chart (e.g., the cumulative confidence level achieved for the second product variant after the fourth specimen is tested is indicated in the final column as $C_{24}$, e.g., $C_{ij}$). It will be appreciated that a different number of component samples may be used in other similar embodiments without departing from the scope of the invention.

It will be understood that the constants needed for these calculations, such as desired reliability, operation time being tested for actual use, and desired confidence level can be set by the user in another non-visible portion of the calculation chart. The set of formulas used to calculate the non-cumulative and the cumulative variables in the chart are as follows, which is a similar set as described in the examples above but with the appropriate double "ij" subscripts added for the specific variant and specimen:

$$c_{ij} = 1 - R_i(t)^{n_{sij}}$$

$$n_{sij} = n_{nij}\left(\frac{t_{nij}}{T_{si}}\right)^b$$

$$n_{nij} = 1$$

$$C_{ij} = 1 - R_i(t)^{N_{sij}}$$

$$N_{sij} = \sum_{k=1}^{j} n_{sik}$$

As will be readily understood, the calculation process or logic follows a similar process for each line of the calculation chart as set forth above in the examples from the physical testing. The $n_{sij}$ and $c_{ij}$ values for the non-cumulative part of the chart are calculated from known values (and the time values set forth below), and then the $N_{sij}$ and $C_{ij}$ values can be calculated for each line of the cumulative part of the chart. Those $C_{ij}$ values then determine how the confidence level plot should move from segment to segment for the different test specimens. One example of such a plot is shown in FIG. 11 for applying the success run reliability testing method to four similar product variants.

As alluded to above, one specific and important difference in this calculation process comes from the calculation of the test duration variables $t_{nij}$. As a preliminary matter, for the same test specimen of each product variant, the test duration of the physical test (under accelerated load conditions) is also applied to be the test duration for the virtual test of the specimens of the other variants. This arrangement of the test duration under accelerated conditions ($t_a$) may be summarized by the following formulas:

$$\begin{cases} t_{aij} = t_{ajj} \\ t_{aii} = \dfrac{t_{nii}}{AF_{ii}} \end{cases}$$

As set forth above, the acceleration factor AF is calculated in advance for each of the product variants and is effectively the ratio of the lifetime under field loads and the lifetime under accelerated loads. The $t_{nii}$ value in the second of these formulas can be specified to be different values in various embodiments, but for the purposes of an example, the following formulas may be used for such values:

$$\begin{cases} t_{nii} = T_n \equiv T_s \left(\dfrac{N_s}{N_n}\right)^{\frac{1}{b}} \\ t_{nij} = t_{aij} \cdot AF_{ij} \end{cases}$$

With $AF_{ij} = \dfrac{t_{fij}}{t_{aij}}$

In this regard, the $t_{nii}$ value in this example is set using the $T_n$ test duration value which would be calculated under the normal physical testing of specimens. The other values in that formula for calculating $T_n$ will be understood from the discussion above. This value can be plugged into the first column of the non-cumulative section of the calculation chart at blocks $t_{n11}$, $t_{n22}$, and so on. Those $t_{nii}$ values can then be used along with the predetermined acceleration factors and the formulas above to calculate the test duration $t_a$ under accelerated conditions for all the combinations of product variant and test specimen (remember that $t_{a11}$ is set equal to $t_{a12}$, $t_{a13}$, and so on, and this is what defines the length of the segments in the horizontal axis of the graphical plot as shown in FIG. 11, for example). Those $t_{nii}$ values can also then be used along with the predetermined acceleration factors and the formulas above to calculate $t_{nij}$ test duration values which get plugged into the first column of the non-cumulative section of the calculation chart shown in FIG. 10.

With the entire first column of the non-cumulative section of the calculation chart set, as well as the actual test durations under accelerated conditions on the test bench 42 as identified by the $t_a$ values, the series of formulas with the double "ij" subscripts listed above can be used in sequence to calculate the other non-cumulative and cumulative variables leading to the confidence level points to be plotted on the graphical plot. These calculations are substantially similar to the example provided above for the sequential testing of a single product variant, but with the application of physical and virtual testing of the different product variants as described above in connection with FIG. 6. In this regard, for the first test specimen of each product variant, the process begins by using the formulas to calculate all of the values on that line of the calculation chart (for product variant 1, test specimen 1) to determine what cumulative confidence level $C_{11}$ will result from successful operation of that variant and specimen in physical testing on the test bench 42 for the specific test duration $t_a$ at the accelerated conditions of the test bench 42. Assuming that success run test is successful, the other product variants at test specimen 1 can be virtually tested by having the processor 44 calculate all of the values on the corresponding lines of the calculation chart to reveal what confidence level $C_{ij}$ is reached at the end of the virtual test of the first test specimen of all other product variants. These values can then be plotted on the graphical plot as shown in dashed lines in FIG. 11 with the different confidence levels being a result of the different acceleration factors for the product variants. The physical test result for the first product variant is also plotted in solid line on FIG. 11.

The reliability testing method then moves to the second test specimen of each product variant. In this case, the second product variant is the one to be physically tested on the test bench 42, so the processor 44 begins with completing the corresponding line of the calculation chart using the series of formulas provided above. The cumulative confidence level $C_{22}$ achieved is determined and then the physical success run test is applied to the physical component sample accordingly. If that success run test works without failure, then virtual testing of the other variants of the second test specimen may be conducted by having the processor 44 calculate each of the variables on the corresponding lines of the calculation chart using the series of formulas provided above. This individual set of calculations for each of the second test specimens results in cumulative confidence level values which the different variants will reach at the end of the physical and virtual testing of the second test specimens, those values reflected on the chart as shown in FIG. 11 (a little under 80% for variant 1, a little under 40% for variant 2, and so on).

For each remaining test specimen, these same steps of calculating confidence levels and physically testing one of the product variants to confirm that all of the product variants will pass the success run testing is repeated. Following the final test specimen, which is the fourth test specimen in the example of FIG. 11, each product variant can be evaluated for whether it actually achieved the desired confidence level. As shown in FIG. 11, product variants 1, 2, and 3 all achieved confidence levels of 80% or higher, which would be acceptable under the example goal of 50% described above. By contrast, product variant 4 only achieves the desired reliability at a confidence level of about 40%, which may not be acceptable depending on the specified test parameters and customer demands. In events such as this one, further testing of the fourth product variant may be required before it is approved for production and sale to operators of HAWTs, but the first three product variants are ready for production with a minimized amount of physical testing. To this end, the cost savings ratio or "theoretical saving potential" with 3 or 4 product variants (instead of 2 variants in the calculation below) of physical tests in this example is about 50% according to the following:

Theoretical saving potential $(TSP) =$ $$1 - \dfrac{\text{physical specimens } acc. \text{ Virtual Dragon}}{\text{physical specimens } acc. \text{ Classical Dragon}}$$

$$TSP = 1 - \frac{2 \text{ physical tests}}{2\frac{\text{tests}}{\text{variant}} \times 2 \text{ variants}} = 1 - 0.5 = 50\%$$

Figure 12:
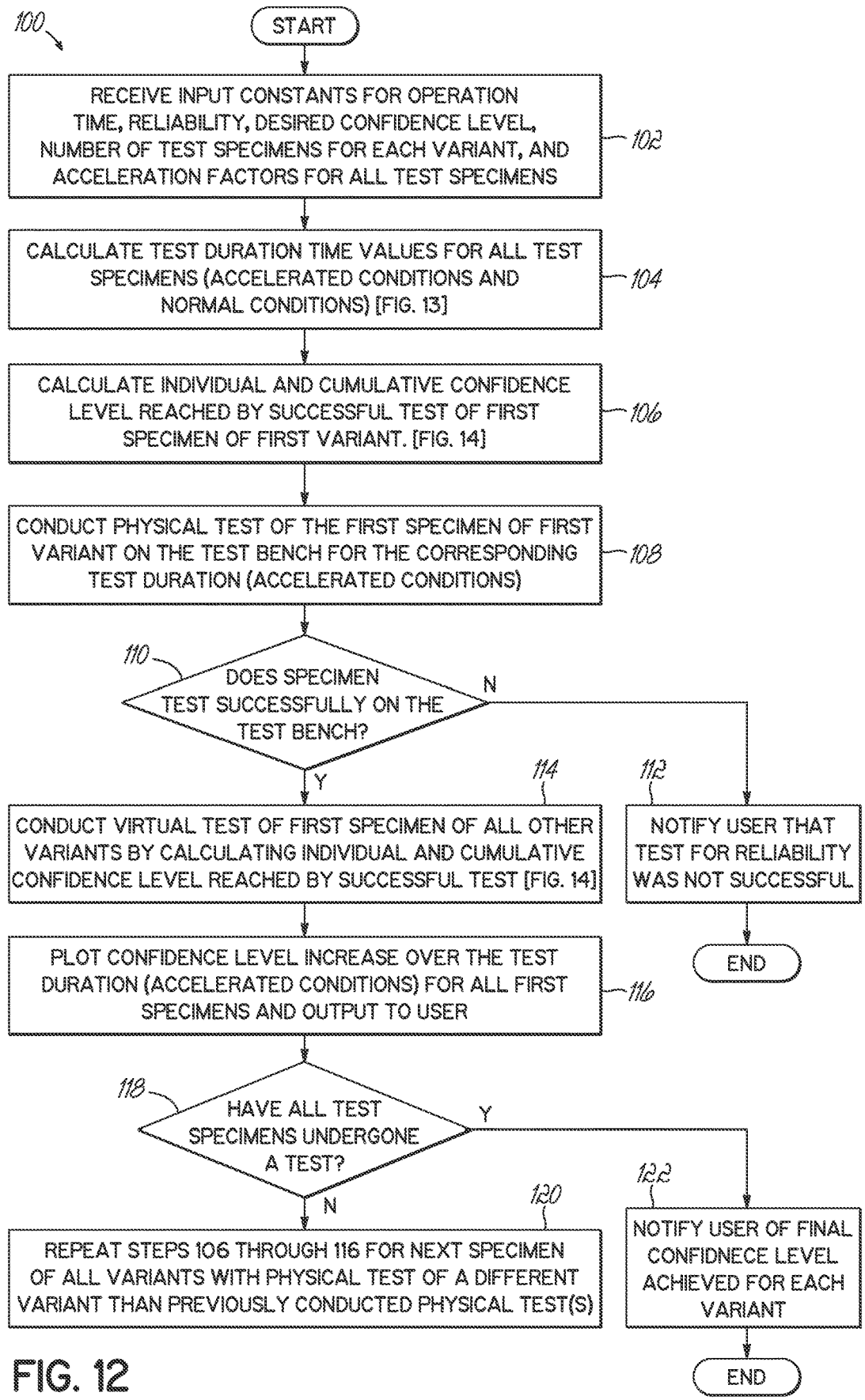
FIG. 12 is a flowchart illustrating a series of steps executed by components of a reliability test system when performing one embodiment of the reliability test method of the invention.
Figure 13:
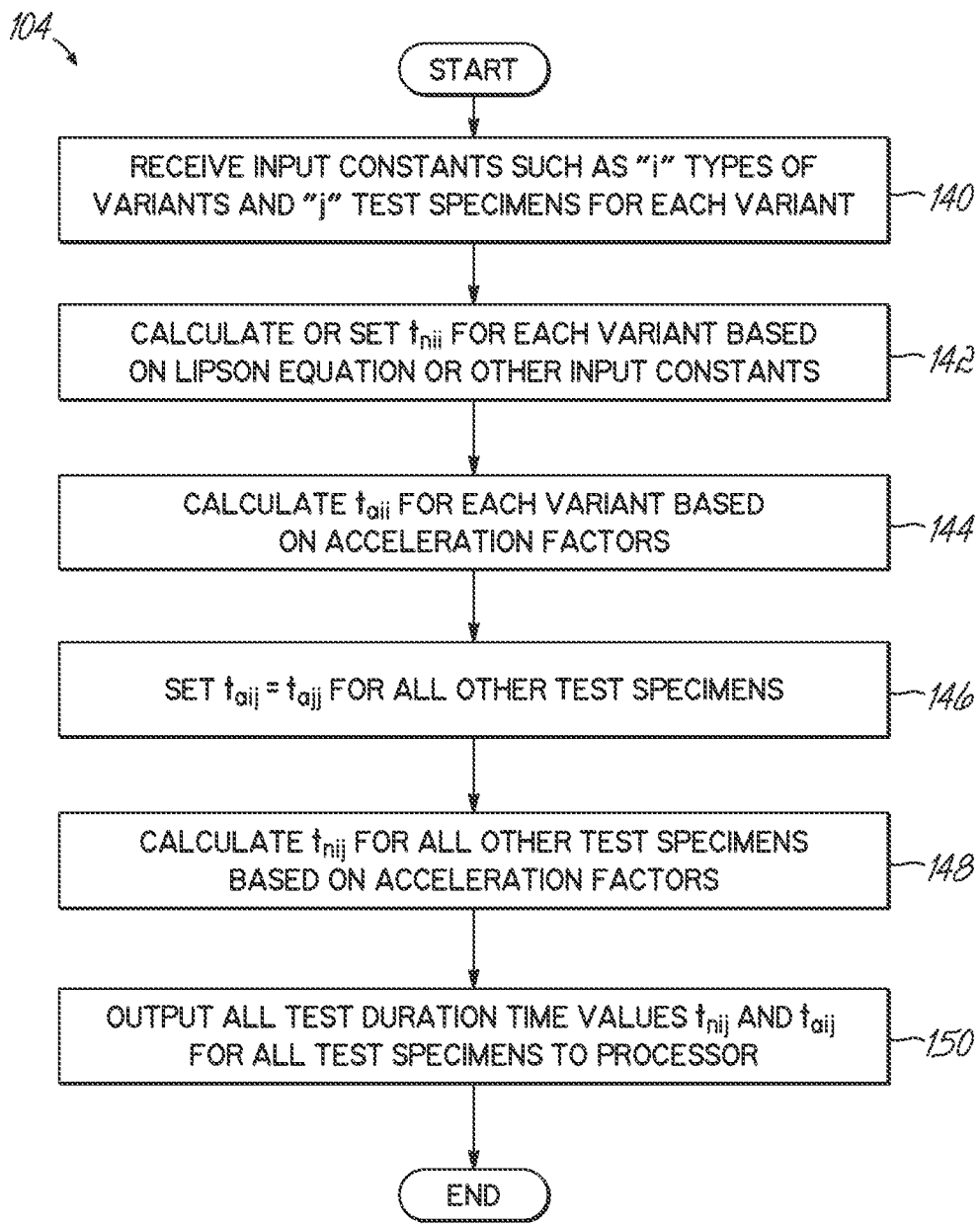
FIG. 13 is a flowchart illustrating a series of steps executed by a processor of the reliability test system when calculating test duration time values for all test specimens, which is one step of the reliability test method shown in FIG. 12.
Figure 14:
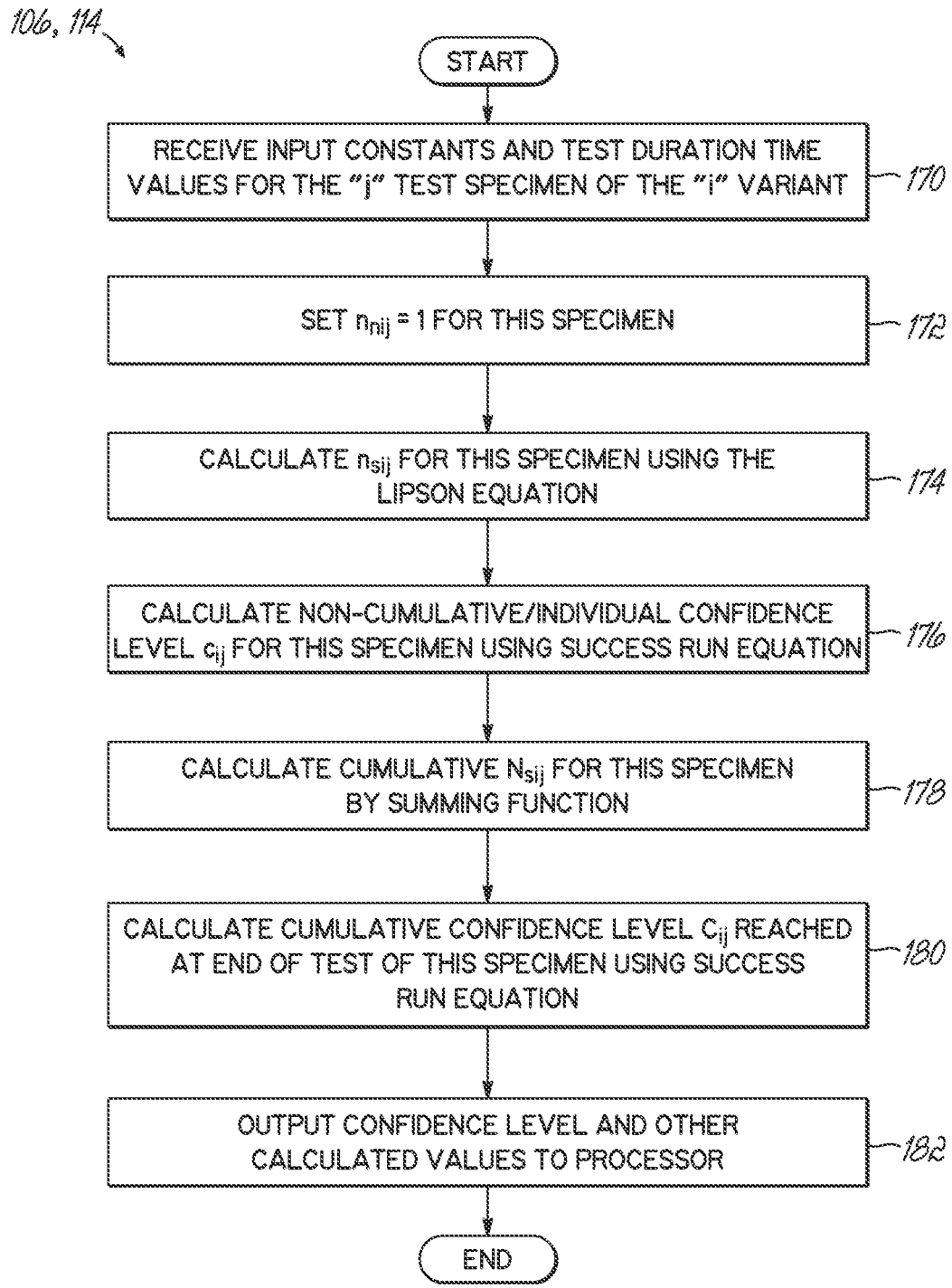
FIG. 14 is a flowchart illustrating a series of steps executed by a processor of the reliability test system when calculating individual and cumulative confidence levels reached for one test specimen of one product variant, which is one step of the reliability test method shown in FIG. 12.

The reliability testing method of this disclosure can further be understood by the step-by-step summary of one embodiment of the method using physical and virtual product testing, as outlined at FIGS. 12 through 14. To this end, the overall reliability testing method is shown as flowchart 100 in FIG. 12, with specific steps of this flowchart 100 being further illustrated in the flowcharts of FIGS. 13 and 14, described below. The success run reliability testing method of this invention produces similar confidence level test results as conventional all-physical component testing, while necessitating significantly less test bench time and other resources.

With specific reference to FIG. 12, the method starts by having the processor 44 retrieve from the memory 46 or from a user input device (not shown, may be the same as the output device 48) various input constants and values needed for the testing process and calculations, at block 102. For example, these input constants can include, but are not limited to: the operation time for which is being tested, the desired reliability, the desired confidence level to be reached, the number of test specimens available for each variant, and acceleration factors for all test specimens. It will be understood that while the term "variant" is used throughout this application and the flowcharts, this term is to be deemed broad enough to cover any set of components which are simultaneously tested using this process. To this end, "variants" could be the same/equal product subject to different loads and/or minor variations of the same product, from a reliability context. Furthermore, in other embodiments described further below, different products tested in parallel may also be subject to benefitting from the reliability testing methods described herein, even though these are not "variants" as understood in the other embodiments.

The method then continues with a calculation of the test duration time values, both under accelerated conditions and normal conditions, by the processor 44 for all test specimens, at block 104. This calculation is set forth in further detail with reference to FIG. 13 below. After the test duration time values are determined, the processor 44 then calculates the individual and cumulative confidence level that is reached following a successful test of the first specimen of the first variant, at block 106. This calculation is set forth in further detail with reference to FIG. 14 below. The test bench 42 and drive unit 52 are operated to physically test the first specimen of the first variant over the test duration (accelerated conditions), at block 108. The test bench 42 or the user communicates to the processor 44 whether the physical test of this first specimen was successful, at block 110. If the physical test was not successful, e.g., the specimen failed before the end of the specified test duration, then the processor 44 uses the output device 48 to notify the user that the reliability test was not successful, at block 112, and the method ends at this juncture. It will be understood that the calculations of confidence level at block 106 may be conducted after the physical test at block 108, without departing from the scope of this advantageous method.

Alternatively, if the physical test was successful at block 110, the method proceeds with conducting a virtual test of the first specimens for all other variants, at block 114. To this end, the processor 44 calculates the individual and cumulative confidence levels reached by the successful tests of those first specimens. This calculation is set forth in further detail with reference to FIG. 14 below, and is substantially the same as the calculation performed at block 106. With all confidence level results for the first specimens determined, the processor 44 plots the confidence level increases over the test duration (accelerated conditions) for all first specimens of the variants and outputs this information to the user, such as by output device 48, at block 116.

The processor 44 continues the method of this embodiment by determining whether all test specimens have undergone a test, whether physical or virtual, at block 118. If not all specimens have been tested, then the steps outlined at blocks 106 through 116 (as needed) are repeated for the next specimen of all variants, at block 120. The test bench 42 and processor 44 are to physically test a different variant than what has been physically tested before while repeating these steps, if possible. For example, in the example of four product variants and four test specimens for each variant, the second variant would be physically tested for the set of second test specimens (all others virtually tested), the third variant would be physically tested for the set of third test specimens (all others virtually tested), and so on. This process will lead to all test specimens receiving one of the types of tests, or alternatively, a failure of a physical run of one of the tests as described with connection to block 112 above. If all test specimens have been tested at block 118, then the method proceeds by having the processor 44 notify the user of the final cumulative confidence level achieved for each variant at the end of the testing, such as by the output device 48, at block 122. The reliability testing method then ends.

Now turning with specific reference to FIG. 13, the step at block 104 of the method in the FIG. 12 flowchart is expanded to explain the steps of the process which is performed by the processor 44 to calculate the test duration time values for all test specimens, under accelerated conditions as well as under normal conditions. This calculation process begins by receiving input constants including the total number "i" of types of product variants and the total number "j" of test specimens provided for each variant, as well as acceleration factors for each of the specimens and variants, at block 140. The test duration time for normal conditions of some of the test specimens ($t_{nij}$), which are to be physically tested, is calculated to be equal to $T_n$ using the Lipson equation as set forth above, or calculated/determined from some other input conditions, at block 142. In this regard, the normal test duration for the physically-tested specimens may be set to alternative values in other embodiments consistent with the practices of reliability testing, but the Lipson equation is used here for consistency with the remainder of the method. For those test specimens to be physically tested, the test duration under accelerated conditions ($t_{aii}$) is calculated based on the acceleration factors applicable to those specimens, at block 144. This value determines what the actual physical test duration will be on the test bench 42 for each variant, and this value also sets the horizontal distance on the plots of confidence level over time which are eventually generated in the reliability testing method.

The calculation process then continues by setting the test duration under accelerated conditions for all other specimens ($t_{aij}$) to be equivalent to the test duration under accelerated conditions for the corresponding specimen of the variant being physically tested in that group (e.g., $t_{aij}=t_{ajj}$), at block 146. With those test duration under accelerated condition values in hand, the processor 44 then calculates the test duration under normal conditions ($t_{nij}$) for all other test specimens based on the corresponding acceleration factors, at block 148. All of the test duration time values for all test specimens can then be output to the processor 44 for further use in the reliability testing method, at block 150. For reference, the accelerated condition test durations define the physical test durations and the horizontal axis of the plot of confidence level over time, while the normal condition test durations are used in further formulas to calculate the confidence level achieved by the tests. Thus, the calculation process of FIG. 13 provides all the information necessary for the processor 44 to continue with the reliability testing method described in detail herein.

Now turning to FIG. 14, the calculation of individual (non-cumulative) and cumulative confidence level reached at the end of a physical or virtual test is provided in detail in a step-by-step flowchart, each of the steps being conducted by the processor 44. This flowchart is the calculation process which occurs at blocks 106 and 114 of the FIG. 12 flowchart and method, for example. This calculation process begins by receiving input constants and test duration time values (calculated at block 104 and described in detail above at FIG. 13) for the specific variant "i" and test specimen "j" currently being considered, at block 170. The processor 44 sets $n_{nij}$ equal to 1 for this specimen, as only one specimen is actually being tested physically or virtually, at block 172. With that information, the non-cumulative variable $n_{sij}$ can be calculated for this specimen and variant using the Lipson equation in the manner set forth in detail above, at block 174. That non-cumulative variable is then plugged into the success run equation by the processor 44 to calculate the individual or non-cumulative confidence level $c_{ij}$ that would be achieved by testing this specimen in the abstract, e.g., by itself, at block 176. These are all of the values needed to fill the calculation chart under the non-cumulative heading.

The processor 44 then calculates the cumulative variables and confidence level achieved. More specifically, the processor 44 calculates the cumulative $N_{sij}$ for this specimen by using a summing function outlined in detail above, at block 178. The processor 44 then uses this cumulative variable in the success run equation to calculate the cumulative confidence level $C_{ij}$ achieved after a successful physical or virtual test of the specimen in question, at block 180. The confidence level values for this test specimen can then be output to the processor 44 for reporting to the user, at block 182. This step brings the calculation process for confidence levels to an end. That cumulative confidence level is what determines the vertical portion of the plot of confidence level changes over time for the test specimen, when this information is later plotted in the reliability testing method. It will be understood that modifications and re-ordering of some steps in the methods set forth in FIGS. 12 through 14 may be possible in other embodiments while remaining consistent with the scope of the currently-described invention.

As initially outlined above, the reliability testing methods described in some the embodiments of this disclosure advantageously reduce the number of component samples which must be subjected to physical test, while also significantly reducing the total test duration for physical testing at the test bench 42 of the test system 40, while still providing confidence level and reliability results for operation time duration (as described in the examples above) and/or other desired operational parameters. For example, the number of test specimens or component samples which need to be physically tested can be reduced by 50% when using this method. In other words, whereas an entirety of a plurality of test specimens would require physical testing in conventional methods, the invention described in this application enables physical testing of a first subset of test specimens and virtual testing of a second subset of test specimens. In other embodiments, the test duration of physical testing can be reduced even where the total number of component samples is not reduced, but this still results in a cost savings. These benefits apply regardless of whether the success run testing is arranged to be simultaneous testing of test specimens (as in FIG. 6 above), sequential testing of test specimens (as in FIG. 9 above), or a combination/hybrid of simultaneous and sequential testing.

Figure 15:
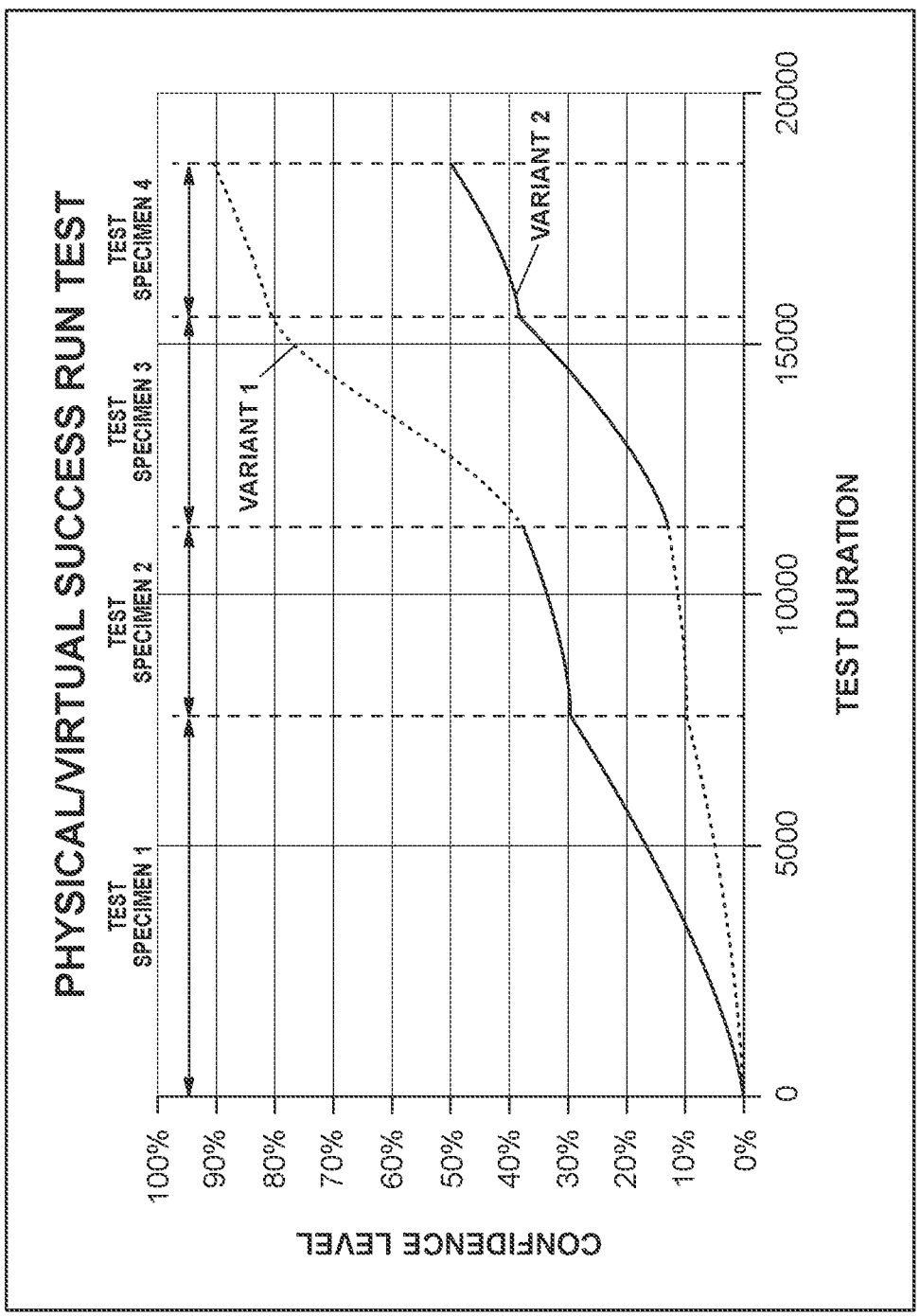
FIG. 15 is a graphical plot showing confidence level test results over time for a combined sequential and simultaneous testing of test specimens for two different product variants, in another embodiment of the reliability testing methods of this invention.

One example plot of such a combination of simultaneous and sequential testing of specimens according to the reliability testing methods described above is shown at FIG. 15, using the process steps and calculations as detailed above. These calculations result in the FIG. 15 plot of confidence level over time in the same manner as the examples provided above, and thus will be readily understood without further detailed description here. To this end, the calculations and methods operate the same when testing the four specimens shown in FIG. 15 as in the simultaneous testing and sequential testing examples provided in detail above. The only difference is that two specimens on the first variant are sequentially physically tested (with two specimens on the second variant being simultaneously tested in a virtual manner), and then two specimens of the second variant are sequentially physically tested (with two specimens of the first variant being simultaneously tested in a virtual manner).

As with prior examples, FIG. 15 shows that the costs of testing can be reduced by about 50% (or more) from conventional reliability testing which is entirely physical test bench-based, in view of reducing the number of test specimens subjected to physical test from 8 to 4. Accordingly, the benefits of reducing costs can be achieved in sequential testing, simultaneous testing, and a combination thereof. With specific reference to this example shown in FIG. 15, the cost savings ratio can be summarized as follows:

$$\text{Costs saving ratio} = 1 - \frac{4 \text{ specimens} + \text{costs of 4 tests}}{2\frac{\text{specimens}}{\text{variant}} \times 4 \text{ variants} + \text{costs of 8 tests}} = 50\%$$

The combination of physical and virtual testing in the success run context is appropriate in several types of technical contexts, including the aforementioned testing of drive train components of HAWTs. In one such context, similar products which have previously been determined to behave similarly during testing can be physically and virtually tested according to the success run reliability testing method. Again, the assumption enabling the virtual testing is that these similar products would continue to behave similarly in physical reliability tests, thereby rendering moot the need for more than one variant to be physically tested. Two gearboxes of similar design, two generators of similar design or two hub bearings of similar design could be subject to such a process, for example. In another context appropriate for the methods of this invention, a set of equivalent products or product lines which will be subjected to different field loads are tested using the method, as such equivalent products will likely behave similarly in physical reliability tests. Again, some of the physical tests of the different loadings would be redundant, so virtual testing can be used in conjunction with physical testing to arrive at the same results and confidence levels.

Although a 100% similarity is assumed in the description of exemplary embodiments above, a similarity factor of less than 100% could also be established based on the degree of correlation or comparability of typical physical test results, this similarity factor being used to affect one or more of the reliability variables R, t, C or N in the process described above. The similarity factor between variants can be estimated based on a similarity of components integrating the variants, the design load sets, the design parameters, the failure mode risks, and the test conditions such as loads, acceleration factors, and the like. Largely regardless of the specific amount of similarity between specimens and variants being tested, the physical and virtual success run testing in accordance with the reliability testing methods described above can be used to reduce the overall testing costs and resources needed. The one exception to this rule or benefit is where there is 0% similarity between the variants, as then the physical testing for one variant will have no bearing whatsoever on how the second variant would physically test on the test bench. Generally speaking, the amount of confidence level of reliability or other desired operation variables that will be reached when applying the virtual testing to other product variants will decrease as the similarity factor decreases.

When the similarity factor is not equal to 100%, as has been assumed in the examples throughout this specification, a modified step is included in the process of calculating the confidence level reached during a successful test of a test specimen, which was previously described as shown in FIG. 14. To this end, the Lipson equation that is normally used at step 174 of this flowchart to calculate the non-cumulative variable $n_{sij}$ is modified as follows to account for the similarity factor:

$$n_{sij} = f_{sij} \cdot n_{nij} \left(\frac{t_{nij}}{T_{si}}\right)^b$$

The $f_{sij}$ variable is the similarity factor, which is estimated or calculated beforehand for all of the variants. All other values in this modified Lipson equation are already known and/or defined above. The similarity factors may be defined in a X-by-X matrix for X variants where the values along one of the diagonals of the matrix is always 100%. In other words, $f_{sii}$ or $f_{sjj}$ is always equal to 100% because a variant is always going to be considered to test in an identical manner to itself during the testing process, hence the 100% similarity factor. However, all other $f_{sij}$ values may not be 100% as a result of the differences between how the variants test in reliability testing. The calculation step at block 174 of FIG. 14 is therefore unaffected for the physically tested samples in the example(s) above where these are the first test specimen of variant 1, the second test specimen of variant 2, and so on ($n_{s11}$, $n_{s22}$, and so on). However, for all other specimens, e.g., those to be virtually tested ($n_{s12}$, $n_{s21}$, and so on), the "n" variable that is later used to calculate the confidence level achieved by a successful virtual test is affected by the calculation above because the corresponding $f_{sij}$ values may not be 100%.

Figure 16:
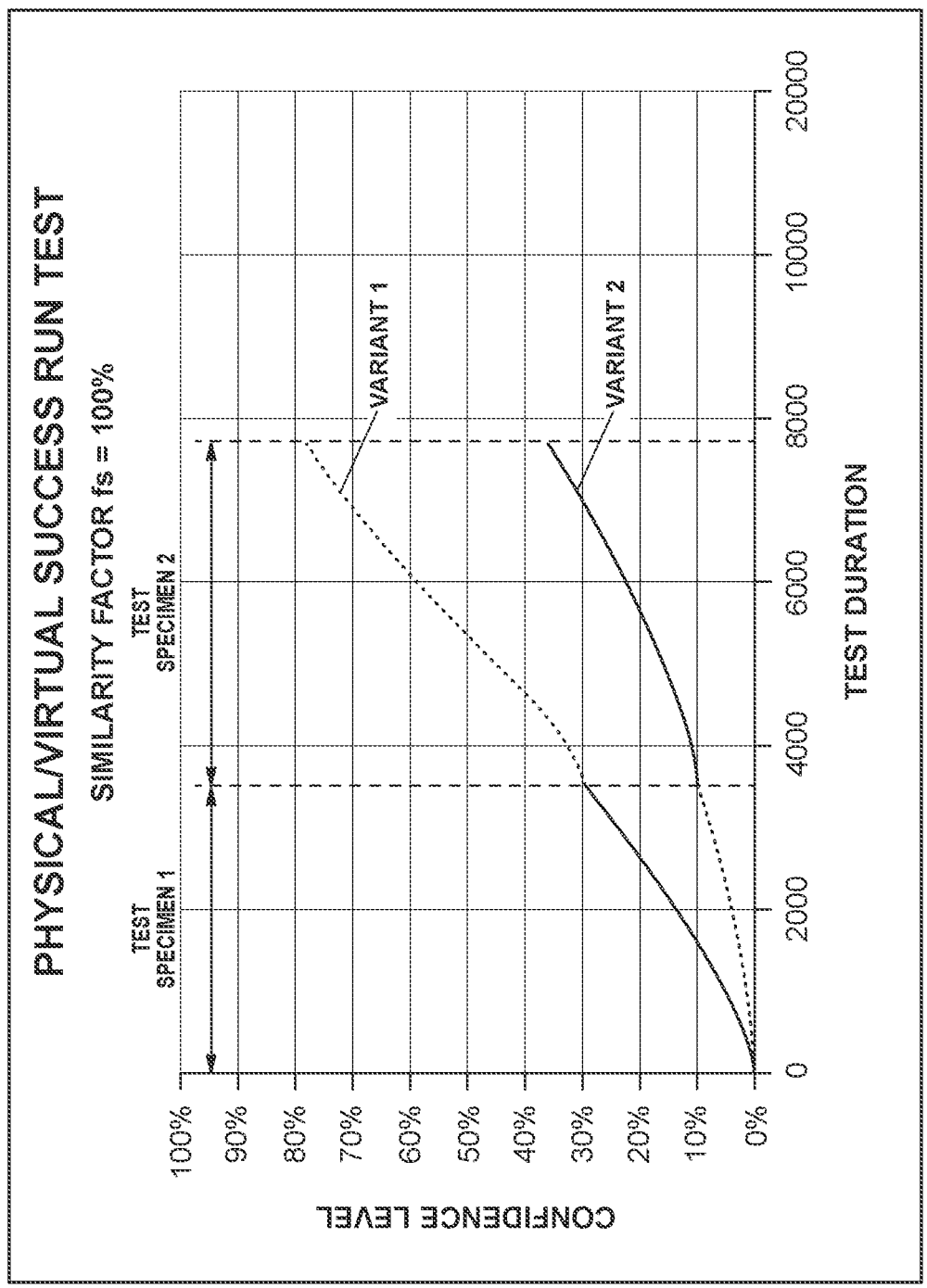
FIG. 16 is a graphical plot of confidence level test results over time similar to FIG. 6, showing one embodiment of the reliability testing method of the invention described in this application, and in which the similarity factor applied when converting physical test bench results to virtual test results is about 100% between the two variants shown.
Figure 17:
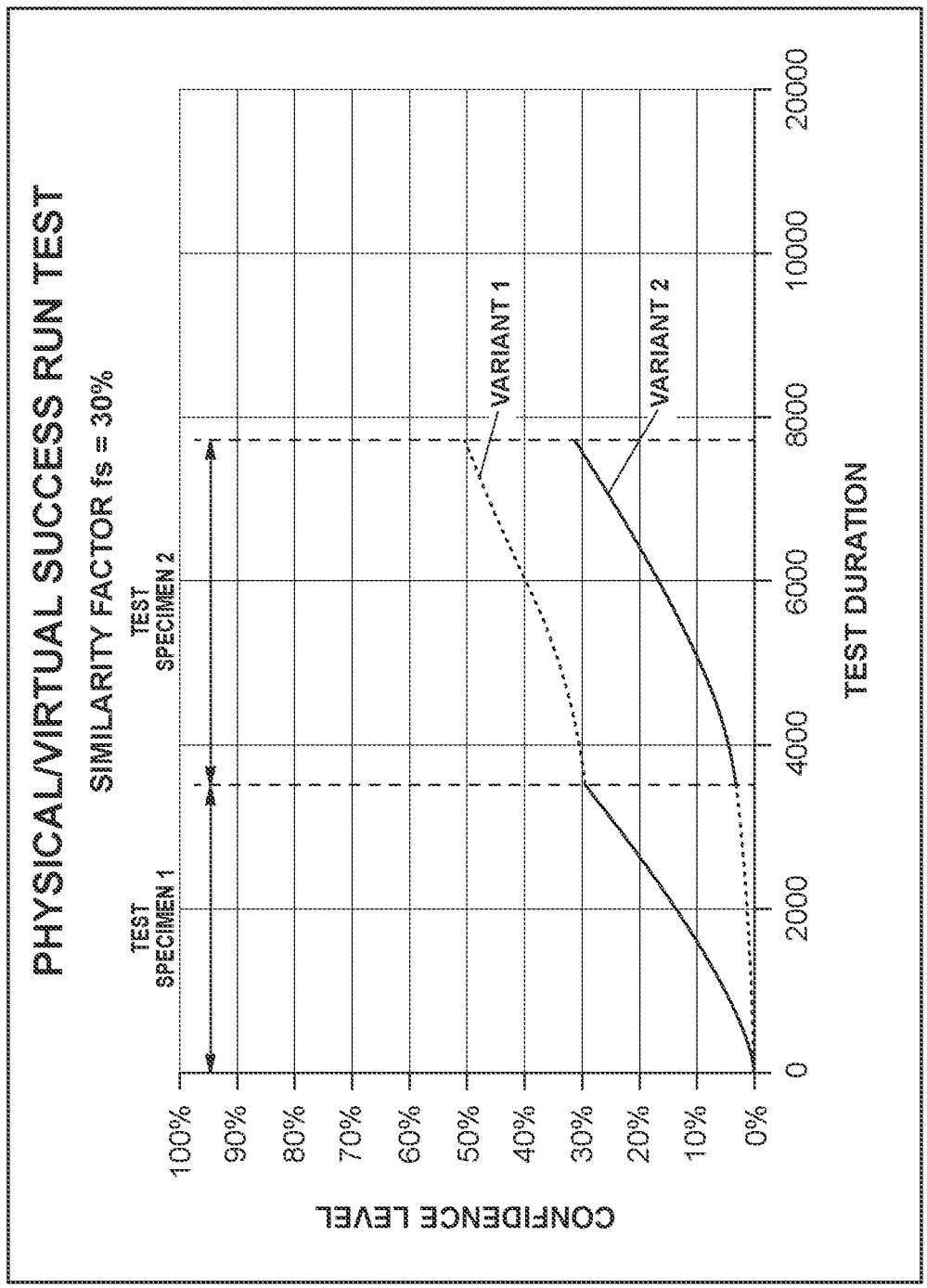
FIG. 17 is a graphical plot of confidence level test results over time similar to FIG. 16, but in which the similarity factor applied when converting physical test bench results to virtual test results is about 30% between the two variants shown.
Figure 18:
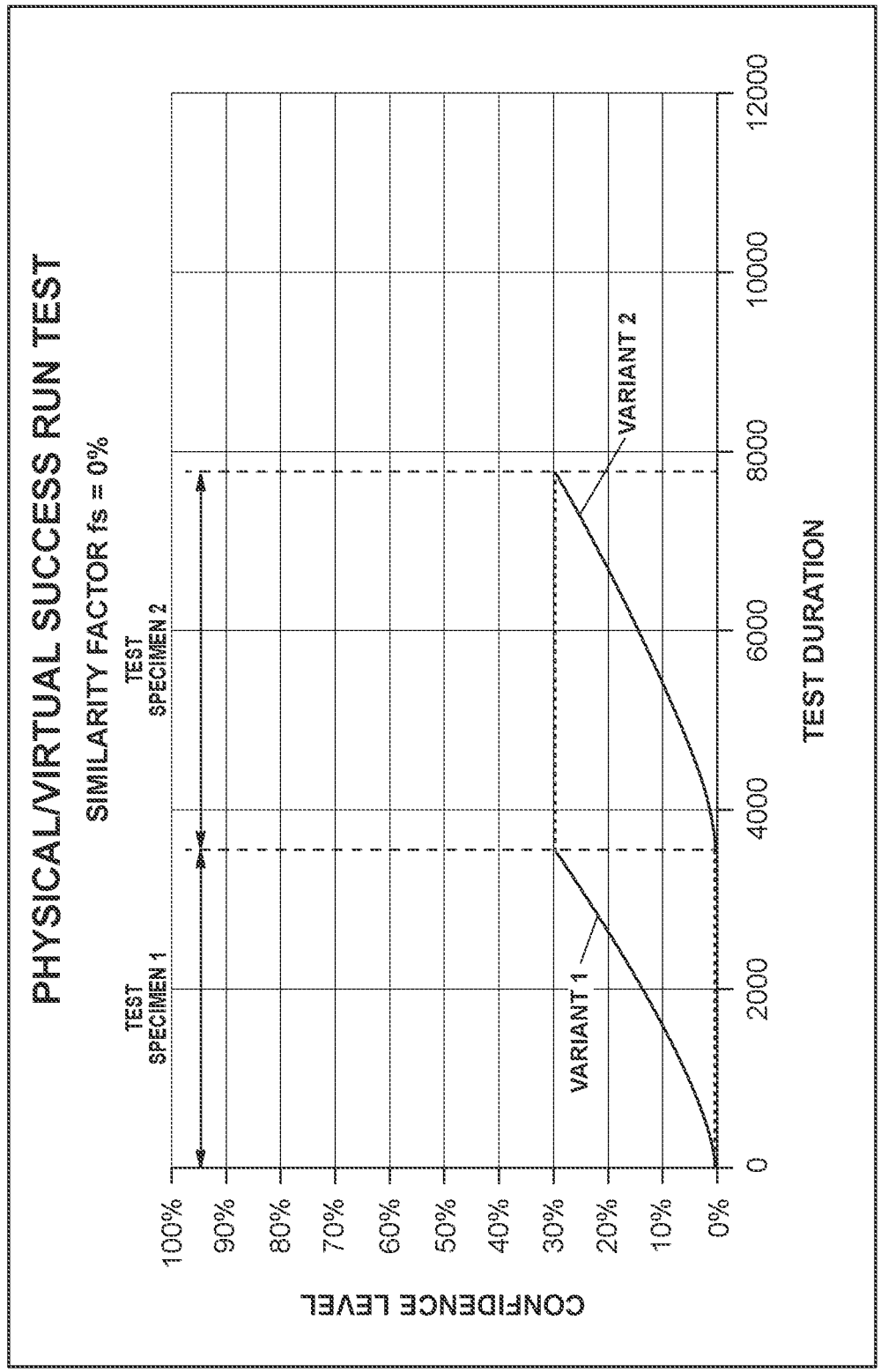
FIG. 18 is a graphical plot of confidence level test results over time similar to FIGS. 16 and 17, but in which the similarity factor applied when converting physical test bench results to virtual test results is about 0% between the two variants shown.

An example of the effect of different similarity factors on the graphical plot results like those shown above is now provided to clarify this concept further. FIGS. 16 through 18 show exemplary physical/virtual success run test results using the same variants and the same test durations for the physical tests (made by the process of the reliability testing methods described in detail above), but with different similarity factors between the variants. In this regard, FIG. 16 shows the results of applying the physical test results in solid line to virtually test other test specimens as shown in phantom dash line. As readily seen from FIG. 16, a full transfer of the testing results between variants can occur for each of the first and second test specimens when the similarity factor is 100%. Now compare that plot to the differences in FIG. 17, in which the similarity factor is 30%, and FIG. 18, in which the similarity factor is 0%. The virtual testing provides significantly less confidence level that can be transferred over by using the successful physical test run of the other test specimen for each of the first and second test specimens. Indeed, in the 0% similarity factor situation of FIG. 18, the virtual testing cannot provide any valuable reliability information in this circumstance, and the confidence level stagnates on these dash line segments accordingly. To put it another way, the physical results for dissimilar variants with 0% similarity factors cannot be transferred in any meaningful way to the other variants.

This result of varying the Lipson equation at step 174 of FIG. 14 on the confidence level plots in FIGS. 16 through 18 comports with what one skilled in the art would expect, as the applicability and advantages of combining physical and virtual testing are most apparent when the variants being tested are highly similar to one another. Therefore, with the exception of circumstances where variants or products to be tested have a 0% similarity factor, the reliability testing methods of the invention described herein are properly adjusted based on similarity of the variants being physically and virtually tested. Consequently, the confidence level achieved, reliability, and/or other similar results can be properly trusted by the end consumer of these driven components being tested with these methods.

Figure 19:
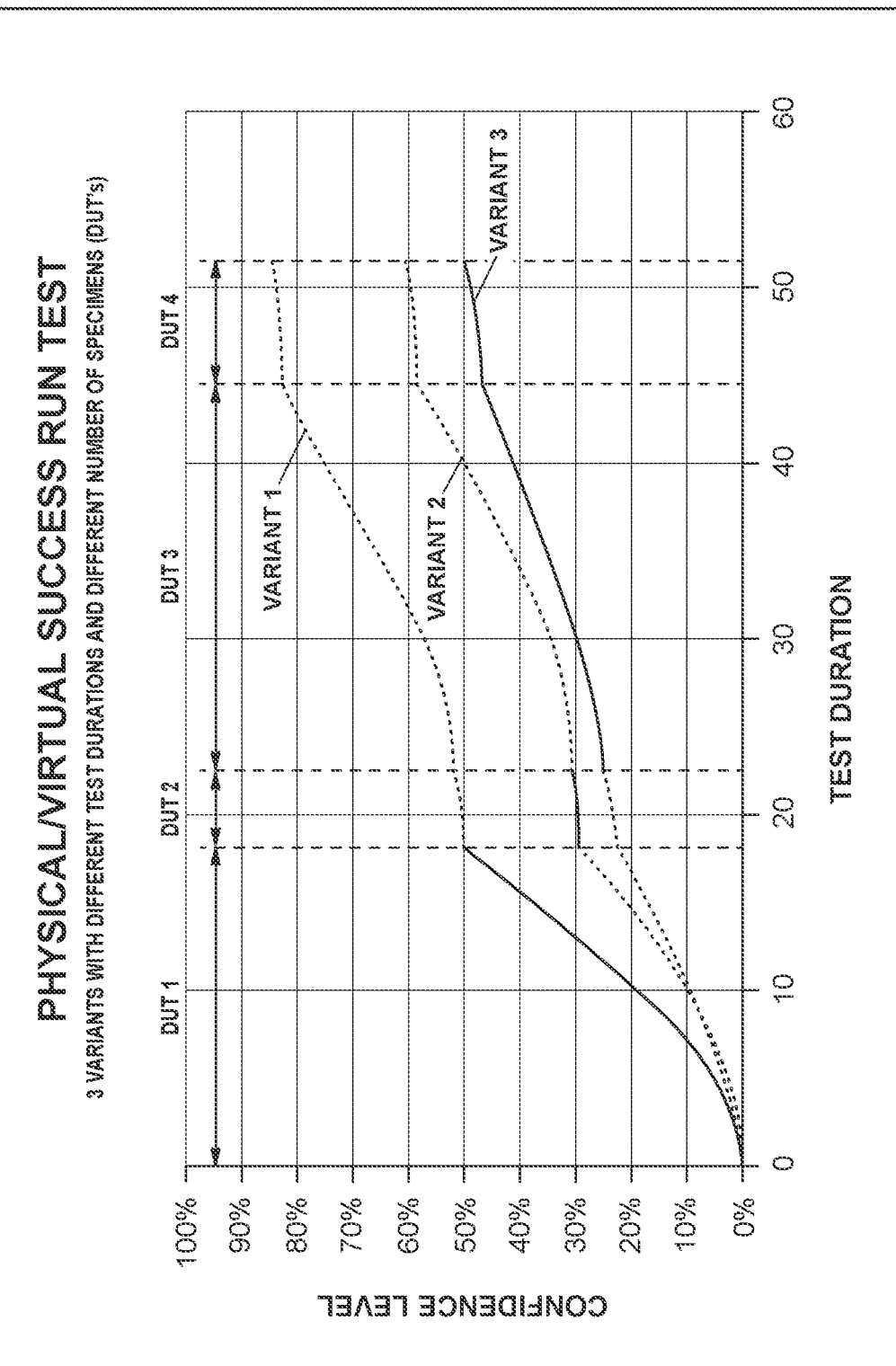
FIG. 19 is a graphical plot of confidence level test results over time for another embodiment of the reliability testing method of this invention, this embodiment saving costs by reducing the total physical test duration time of a third product variant based on application of virtual testing from prior variants.

Turning to FIGS. 19 and 20, another embodiment is provided of the physical and virtual success run testing in accordance with the reliability testing methods of this disclosure. More particularly, this embodiment illustrates potential cost savings in a different manner than reduction of physical component samples to be tested, as has been a principal benefit of many of the previously-described examples. In this regard, driven component products such as gearboxes in a wind turbine may be developed and further modified concurrently with testing of the product line. As such, physical test results from earlier versions or variants of a product may be available when the latter versions or variants are ready for reliability testing. By applying the reliability testing methods described in detail above, these prior physical tests of the earlier variants can be converted to virtual test results of the new variant, and this leads to a reduction of the total test time on the test bench which will be required to reach the desired confidence level for product reliability of the new variant. This same concept can be applied to reduce test times for any circumstance where prior physical testing is available (and where the similarity factor is not 0%, for the reasons described above).

Returning to the specifics of FIG. 19, prior physical test bench results using classical/conventional success run testing is available for variant 1 and variant 2, as shown. The single test specimen of variant 1 was tested for a time duration of 18 time units, which was sufficient to reach a 50% confidence level when applying the success run equations and methodology summarized above in FIGS. 12 through 14. Another single test specimen of variant 2 was tested for a time duration of 4 time units. These test results are shown by the solid line plot portions under the DUT 1 and DUT 2 sections of the FIG. 19 graph. A third variant is now to be tested in such a manner to reach a 50% confidence level for a certain set reliability. Using the classical success run equation calculations described above with the number of component samples set to two, it is determined that completing this test with only physical testing of the third variant's samples (e.g., calculating the $t_n$) will require both test specimens to be successfully run on the test bench for 22 time units apiece. In other words, 2 test specimens and 44 total time units will be needed according to the classical or conventional application of success run testing to achieve the desired result.

However, the prior tests of the single specimens from variant 1 and variant 2 can be applied to result in a reduced overall test duration needed for the third variant's test specimens. As described above in other examples, the test of the specimen from variant 1 is converted to virtual test results for the other two product variants by calculating the confidence level that would have been achieved by the other two product variants if the same test for 18 time units were successfully run according to the success run equations. Depending on the differences in acceleration factors and similarity factors, the second and third product variants may reach different levels of confidence after this first test, as indicated on the FIG. 19 graph. A similar process is then performed to convert the successful test of the second variant's single specimen (under the section DUT 2) to virtual test results of the cumulative confidence level that would have been reached for the other variants undergoing the same successful test for 4 time units. As with prior examples, the virtual test results are plotted on the graph in dash line format.

Calculations are then performed for the third test specimen, which comes from the third product variant as set forth above. In this example, the third variant still does not reach the desired 50% confidence level at the end of the full 22 time units of physical testing, so a similar time period of testing can be virtually applied for the other two product variants as well using the calculation processes described above. Repeating these calculations for cumulative confidence level achieved using the fourth test specimen, which also comes from the third product variant, it is determined that this fourth test specimen only requires successful testing for 7 time units to reach the desired confidence level of 50%. Once again, this physical test result of the specimen, if successful on the test bench, is converted to virtual test results for the other two product variants as well. The overall cumulative confidence level achieved for the reliability of all three product variants is then shown on the graphical plot of FIG. 19, and it can be seen that the first and second product variants also exceed the desired 50% confidence level. To summarize, the application of the physical and virtual success run testing in accordance with the methods of this invention improves the confidence level results achieved of all the product variants, while also reducing the costs of testing the newest or third product variant.

The cost savings for this embodiment is shown in detail in a calculation chart at FIG. 20, which also provides a procedure for calculating a cost savings for any of the embodiments described herein. As set forth above, the key focus of the embodiment shown at FIG. 19 was to provide reliability testing of the new/third product variant, so the calculation of total costs is limited to only that variant and the corresponding test specimens. As set forth above, the conventional success run testing of the third product variant would have necessitated two test specimens each be physically tested for 22 time units apiece on the test bench to reach the desired confidence level, and those two specimens and 44 total time units are shown in the top portion of the FIG. 20 calculation chart. To simplify the results, the cost of each specimen is set to a value of 1, as is the cost of each time unit of test duration (although such costs will typically be different values based on the specifics of the tests performed and the test benches/resources used). This results in a total costs for the classical or conventional success run test of 46. The same calculations can be made for the actual testing performed using the physical and virtual success run testing of the currently-described invention, with the only modification being that the second test specimen ("specimen j=4") is tested for only 7 time units of test duration. As shown in the lower portion of the FIG. 20 calculation chart, the total costs for the physical and virtual testing comes out to 31. The following equations (introduced initially above) can then be applied to determine the costs saved, and the cost saving ratio:

Costs saved by Virtual Dragon =
(costs associated with testing all variants and specimens
$acc.$ Classical Dragon) − (costs associated with testing
all variants and specimens $acc.$ Virtual Dragon)

Costs saving ratio =
$$\frac{\text{Costs saved by Virtual Dragon}}{\text{Costs associated with testing } acc.\text{ Classical Dragon}} = 1 - \frac{\text{Costs associated with testing } acc.\text{ Virtual Dragon}}{\text{Costs associated with testing } acc.\text{ Classical Dragon}}$$

Note that the term "Dragon" is again used as a shorthand for success run reliability testing in these equations. Applying these equations to the total costs determined in the calculation chart of FIG. 20, the costs saved by using the physical and virtual testing of the current invention are equal to the difference between the total costs of the conventional success run testing and the total costs of the physical and virtual testing method, which is 15 in the example shown. This value can then be used to calculate a cost saving ratio, which in this case is 33%. Consequently, by using the prior test results of the other product variants when conducting the reliability testing of variant 3, the cost savings is about 33% in this example. The specific cost savings would vary based on the different cost per specimen and cost per test duration time unit, each of which was set to 1 to simplify the example. However, this calculation of FIG. 20 confirms that the physical and virtual reliability testing methods of this disclosure continue to provide cost saving benefits even when the same number of test specimens are required to confirm the reliability to a desired confidence level.

It will be understood from the example of FIGS. 19 and 20 that any combination of test duration, number of product variants, number of test specimens, acceleration factors, and similarity factors can be used when applying the physical and virtual reliability testing methods of this disclosure. For example, the test results from only the first variant could have been applied to reduce the test duration needed for the third variant in one alternative to that shown in FIG. 19, although it would be clear that the lack of the second variant test results would reduce the cost savings achieved in such an alternative, compared to the 33% cost savings described above. Likewise, if more testing of the first and second variants and/or other variants were available, those test results could also be used in other similar alternatives to further reduce the costs necessary for testing the third variant. To this end, depending on the amount of prior testing performed and the similarity factors (which determine how applicable those prior test results are to the confidence of other variants), the total time duration and costs may be reduced by a significant amount, even more than 50% as shown in the next example below.

Figure 21:
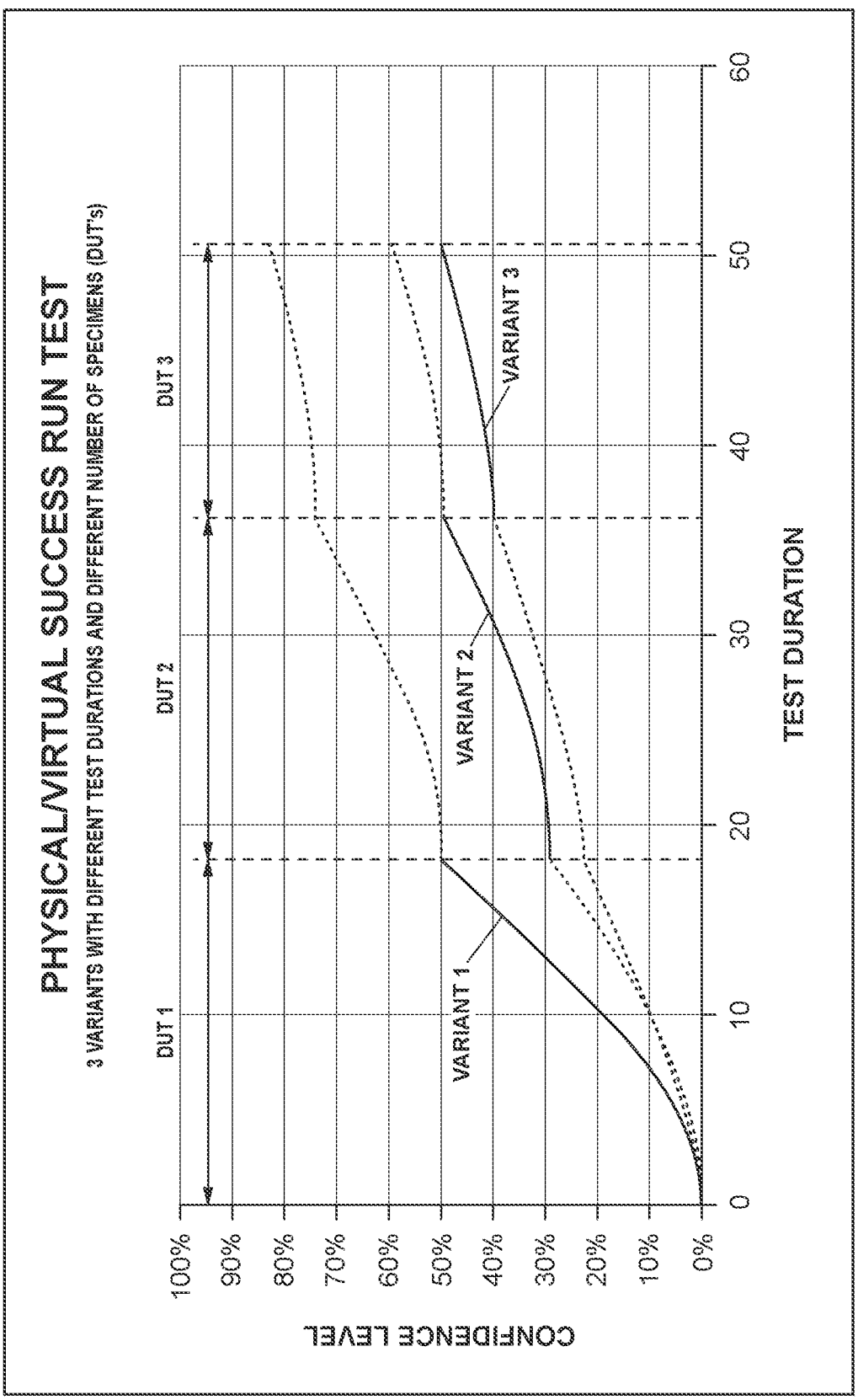
FIG. 21 is a graphical plot similar to FIG. 19, but for another embodiment where the total reduction of physical test time defines an even greater cost savings.

FIG. 21 shows an example that is similar to FIG. 19 in that it involves applying prior physical tests of other product variants to reduce the costs of testing a new third product variant. The cost savings in this example are greater as a result of longer test durations of the prior samples and variants. The FIG. 21 example is the same as the one set forth above for FIG. 19, with one exception: the single test specimen of the second product variant was physically tested for 18 time units just like the single test specimen of the first product variant, instead of the 4 time units shown in the FIG. 19 embodiment. The third product variant is the same as before, meaning that the conventional success run testing based on calculations of $t_n$ above would require two test specimens to be successfully run for 22 hours apiece on the test bench to achieve the desired reliability at a confidence level of 50% or more.

However, the longer test duration of the second product variant now leads to the cumulative confidence level of the third product variant reaching about 40% based on the virtual testing converted over from these prior physical tests of the first and second variants. This is a higher confidence level than the similar spot on the FIG. 19 graph at the end of the virtual tests of the third product variant, and it leads to calculations which determine that only one of the two test specimens of the third product variant needs to be successfully physically tested for 14 time units of test duration in order to reach the desired cumulative confidence level of 50%. This physical test is also shown on FIG. 21, along with the corresponding virtual tests which can be calculated for the other product variants in accordance with the calculations and process steps set forth above.

When calculating the cost savings of the FIG. 21 embodiment, a similar calculation chart like the one shown in FIG. 20 can be used. In this example, the fourth overall test specimen is rendered unnecessary, as well as 30 total time units of test duration: 22 for the unused fourth specimen and 8 (difference between 22 and 14) for the third specimen. Applying the same simplified assumptions of a cost per specimen of 1 and a cost per time unit of 1, the total cost savings for the FIG. 21 embodiment as to variant 3 would be 31 cost units. The cost savings ratio would then be about 67% in this embodiment. Thus, the beneficial cost savings can be even more than 50% when sufficient prior test results are available for use with the reliability testing methods of this disclosure, and it is also possible based on this example to save both in the number of test specimens necessary for physical test as well as the test duration.

Regardless, it will be appreciated from each of the different types of examples and embodiments above that a test duration reduction (and/or a test specimen reduction) and the associated cost savings can result from using the methods described herein with any existing combination of previous physical tests, whether they include one or more of: varying number of specimens tested, arbitrary durations of the tests, differing acceleration factors, and differences in achieved reliability, confidence level, or product lifetime.

As initially identified above, another context in which the reliability testing methods described herein are deemed useful is the testing of different products in parallel. For example, in the drive train of a HAWT, the gearbox and main bearing elements are often tested together in parallel because the input loads for those components generate from the same shared source, in this case, the wind turbine rotor. Even though the total number of physical test specimens may not be able to be reduced from the typical of two specimens per component, the physical testing that must occur for both sets of specimens may be planned and evaluated according to similar rules and methodology as set forth above, to thereby achieve maximum efficiency in the reliability testing. Instead of using the virtual testing to transfer results from one variant or product to another, this embodiment of the reliability testing methods provides simple and efficient planning and evaluation of test results of different products in parallel.

Figure 22:
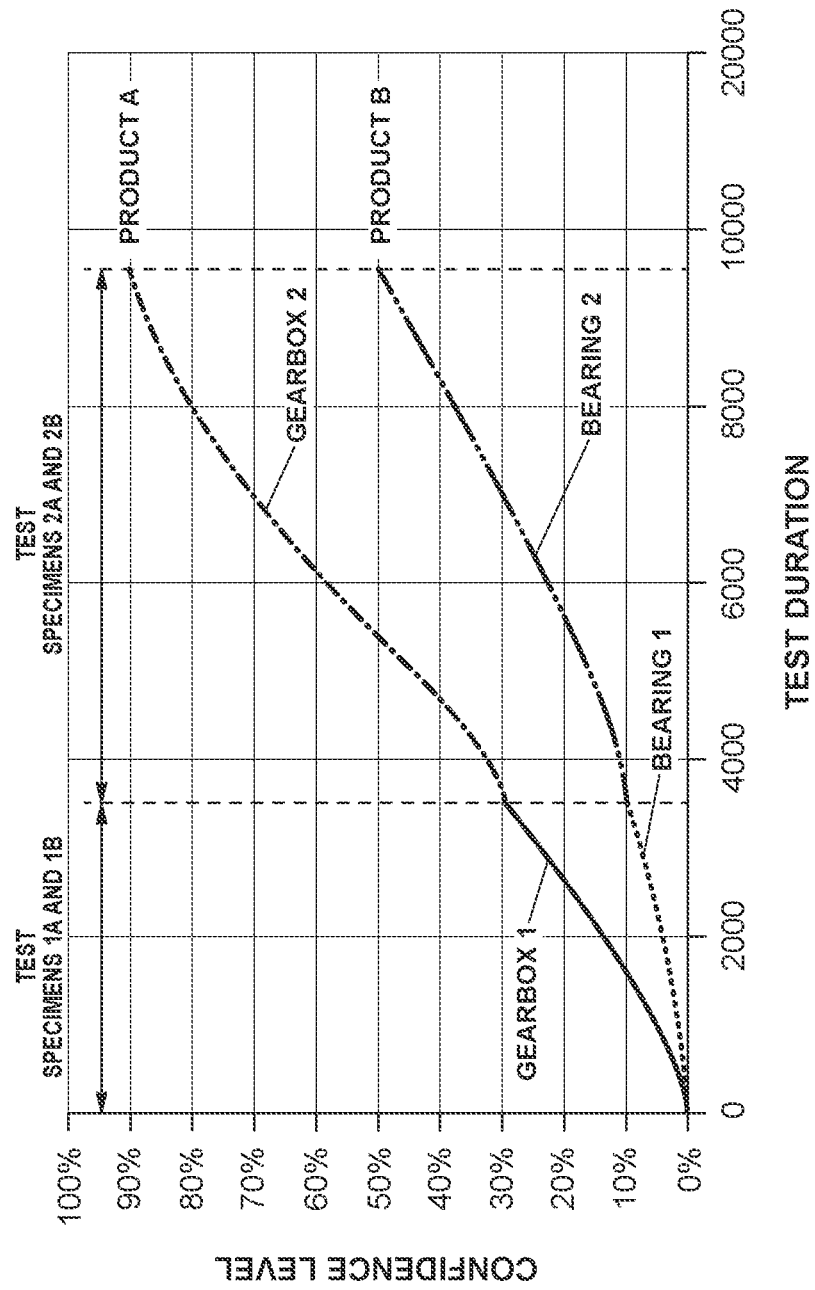
FIG. 22 is a graphical plot of confidence level test results over time for another embodiment of this invention, this embodiment including testing of different products in parallel, which benefits from planning and evaluating physical tests using the reliability testing method of this invention.

With specific reference to FIG. 22, the physical test results for the drive train components are shown as a rise in confidence level (for reliability or some other process variable) over a test duration time, similar to the previous embodiments. To this end, the different products in this embodiment to be tested in parallel are the gearbox and main bearing of a HAWT (although other examples of different components driven together in use will be possible as well in accordance with the scope of this disclosure, such as a generator). As with a conventional or classical success run testing design, two specimens of the same drive train, with each drive train including a gearbox and a bearing, are provided for the reliability testing. These elements are labeled gearbox 1 (test specimen 1A) and bearing 1 (test specimen 1B) for the first drive train in the FIG. 22 plot, and gearbox 2 (test specimen 2A) and bearing 2 (test specimen 2B) for the second drive train. The planning and evaluation of such a test is handled using the methodology and steps described above.

To this end, just like with virtual testing of non-physically tested specimens, the components for a given drive train are subjected to the same test duration even though these elements are subjected to different loads. For example, the main bearing is subjected to loading in the form of forces and moments around all x, y, and z axes in three-dimensional space, except for torque, which is the relevant loading on the gearbox. A common load or stressor on both components is the rotational speed coming from the rotor, which is used for both components tested in parallel. Thus, by testing the gearbox at the relevant speeds to be used in actual production, the same speeds can be applied to the bearing which will also be used in actual production.

Figure 23:
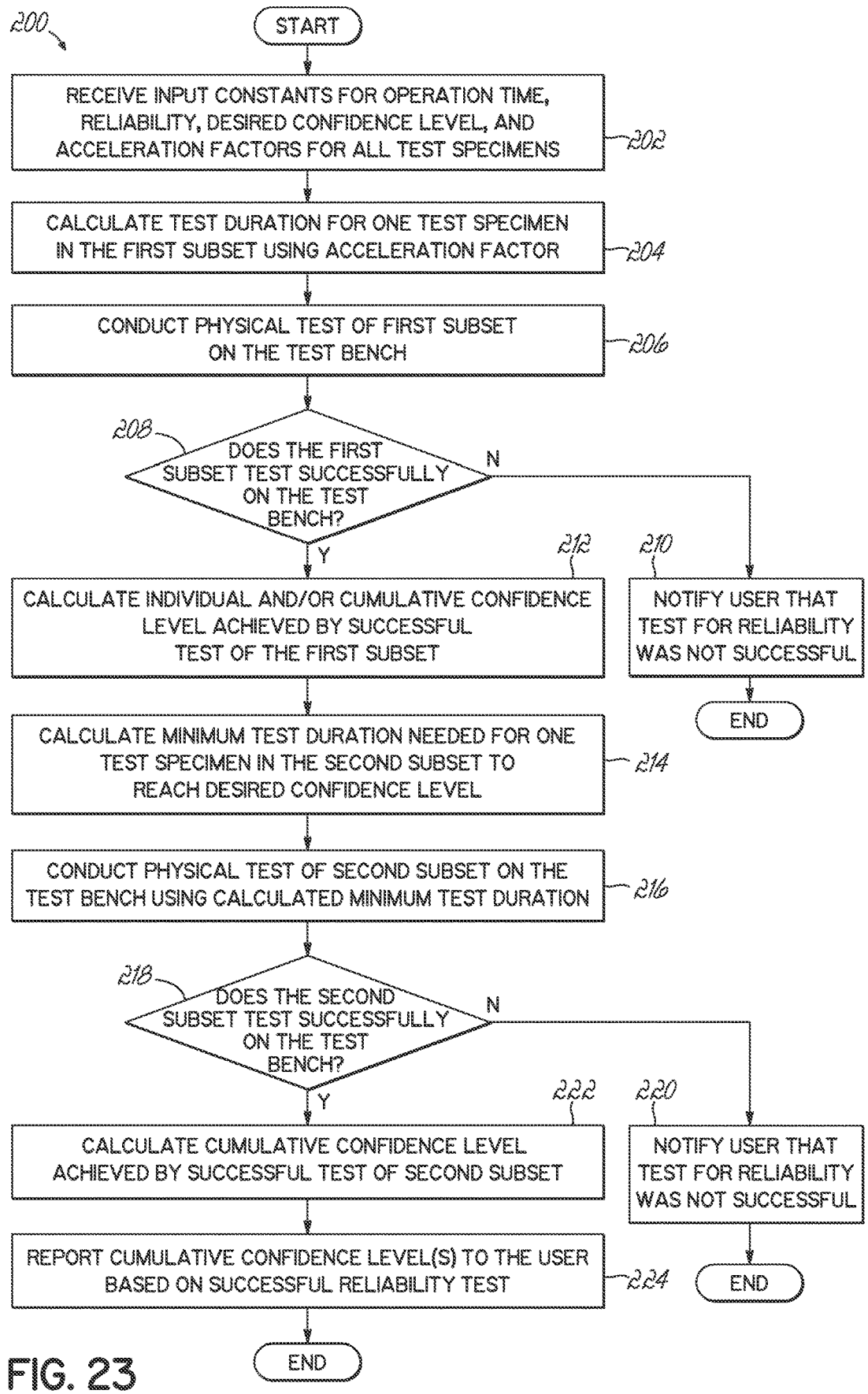
FIG. 23 is a flowchart illustrating a series of steps executed by components of a reliability test system when performing another embodiment of the reliability test method of the invention, specifically for testing different products in parallel as in FIG. 22.

Therefore, the gearbox can be used to drive the planning of the physical tests for both drive train components. In this regard, FIG. 23 illustrates a flowchart 200 showing a series of steps that can be used in this embodiment of the reliability testing methods of the current disclosure to efficiently plan and implement the testing of the drive train components in parallel. As with prior embodiments and products, independent acceleration factors for the testing on the test bench 42 will be defined by the bearing and the gearbox, and the method starts by having the processor 44 retrieve from the memory 46 or from a user input device (not shown, may be the same as the output device 48) various input constants and values needed for the testing process and calculations, at block 202, including the various acceleration factors for each test specimen in the first and second drive trains (also called subsets of test specimens in the flowchart 200). Then, the test duration $t_n$ of the gearbox of the first drive train can be calculated by the processor 44 using the corresponding acceleration factor, at block 204. This calculation can be performed using some of the steps shown in FIG. 13 and described above. For example, this calculation of test duration can be based on similar assumptions as a classical or conventional success run test regarding number of specimens and the like.

Based on the plot in FIG. 22 and the arrangement described above, it will be appreciated that this test duration calculated for the gearbox at block 204 is also the test duration for the bearing in the first drive train or subset. Even though the reliability goals and the acceleration factors may differ between the gearbox and bearing, the time duration will always be the same for these components in view of the different products being tested simultaneously in parallel on the test bench 42. The method then continues by physically testing the first drive train or the first subset of test specimens on the test bench 42 at block 206. The processor 44 then determines whether the physical test of the first drive train was successful on the test bench 42 at block 208, and if not, the user can be notified such as at the output device 48 that the reliability test was not successful at block 210 (the reliability test would then end). If the test of the first subset or first drive train in this example is successful, a confidence level achieved at the end of the physical test of the first drive train can be calculated for each test specimen in the first drive train by the processor 44 at block 212, largely in accordance with the process steps set forth in FIG. 14 and described above. In this embodiment, the confidence level values will be calculated for both the first gearbox and the first bearing, and those values can be plotted on the graph as shown in the first portion of FIG. 22.

Then, assuming that the reliability goal is set for the bearing and the gearbox, which for the sake of simplicity is the same confidence level of 50% for both parts as set forth in examples above, the needed duration of the test of the second drive train can be determined using the similar calculations as those set forth above for virtual testing of components with reference to FIGS. 12 through 14. In the specific example shown in FIG. 22, the bearing has reached a lower confidence level after the first drive train (specimens 1A and 1B) is tested than the gearbox. With the same identical elements being tested in the second drive train or second subset of test specimens, it will be immediately understood that the bearing (specimen 2B) will define the minimum duration of the physical test for test specimens 2A and 2B to reach the desired confidence level goals. To this end, the success run equations described above in connection with sequential testing of components will be used to determine how long a test needs to be run on the second drive train (specifically the second bearing) in order to have the second bearing, and therefore both components, reach the desired cumulative confidence level when combined with the successful test of the first drive train. In other words, the method continues by having the processor 44 calculate a necessary minimum test duration for one product (the bearing) in the second drive train using the success run equations and the results of the physical tests in the first drive train, at block 214.

Accordingly, similar to the embodiments of FIGS. 19 through 21, previous actual test results are used in the evaluation and calculation of a test duration for the next subset of products or specimens to be tested, which is the second drive train in this embodiment. As with the first drive train, the second gearbox must be driven for the same test duration as the second bearing with these products being tested in parallel on the test bench 42. The method then continues by physically testing the second drive train or the second subset of test specimens on the test bench 42 at block 216, specifically using the minimum duration calculated for the second drive train (to thereby avoid overuse or waste of testing resources). The processor 44 then determines whether the physical test of the second drive train was successful on the test bench 42 at block 218, and if not, the user can be notified such as at the output device 48 that the reliability test was not successful at block 220 (the reliability test would then end). If the test of the second drive train in this embodiment is successful, a cumulative confidence level achieved at the end of the physical test of the second drive train can be calculated by the processor 44 for each test specimen in the second drive train at block 222, largely in accordance with the process steps set forth in FIG. 14 and described above. In this example, a cumulative confidence level will be defined for both the gearbox and for the bearing. The confidence level results are then reported to the user by the output device 48 at block 224, such as by plotting these values on the graph over time as shown in the second portion of FIG. 22. This step also brings the method shown in the flowchart 200 of FIG. 23 to an end, as the desired confidence levels have been reported to the user and the reliability testing process in accordance with this embodiment of the invention is complete.

As shown in the plot of results of FIG. 22, following successful completion of the physical tests for the first and second subsets of specimens, which are the first and second drive trains in this embodiment, both of the different products (gearbox and bearing) will be calculated to exceed the desired confidence level of 50%. Furthermore, the physical tests have been carried out with maximum efficiency because planning to use the test specimens and the test bench 42 for a minimum required amount of time will avoid unnecessary costs and delays associated with reliability testing. The process set forth in FIG. 23 can also be considered to apply in the context of the embodiments set forth above in FIGS. 19 through 21, in which the testing of a later product variant is reduced by applying the physical test results of prior test specimens, which in that case was for prior variants of the product. By omitting the block 204 step of calculating test duration for the first subset of test specimens in the FIG. 23 method, that flow chart 200 effectively contains the same steps described above to apply any prior variant testing results to reduce the time duration necessary for successful reliability testing of a new product variant. Thus, the process of FIG. 23 is largely applicable to some embodiments evaluating product variants to save testing costs, as well as the context of planning and evaluating different products tested in parallel associated with FIG. 22.

Accordingly, although no test specimens are unused by the physical test bench in the FIG. 22 example of different products tested in parallel, the tests are planned and evaluated using many of the same process steps and equations as the other examples provided above of the reliability testing methods. Therefore, even without explicitly using "virtual testing" of additional specimens by the application of physical test results to non-physically tested component samples, the methods described herein assure simplicity and efficiency when planning and evaluating such tests of different products. Indeed, such planning and evaluation avoids any risk of excessive physical test duration times, which could otherwise be applied to these specimens in the absence of the methods described herein. Such a benefit is effectively similar to a reduction in testing costs, even though the numerical formulas for cost savings ratio have not been applied in this embodiment. In any event, the reliability testing methods of the present disclosure provide efficiencies and advantages in planning and evaluation of different products to be tested in parallel.

By combining physical and virtual reliability testing (or at least the calculation methods thereof) in the methods described herein, reliability testing and the use of reliability test systems are optimized for efficiency in time and costs.

Accordingly, advantages are provided both for the manufacturer of HAWT components as well as for the customer, who receives the same level of reliability assurance for operating time duration or other operational parameters, without additional delays and costs associated with conventional testing. The more efficient reliability testing methods enable a faster journey between product conception and full production and/or sale in the marketplace, which helps move technology forward more rapidly in the wind turbine field or other fields when using the methods of this invention. Moreover, the goal of minimizing unscheduled downtime for tested components of a HAWT continues to be achieved when using the reliability testing method. Likewise, similar benefits are achieved when using this reliability testing method in any field where driven components need to be tested for reliability before installation.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

The invention claimed is:

1. A method for testing a reliability of a plurality of driven components, wherein at least one test specimen is provided for each of the plurality of driven components, the test specimens are divided into a first subset and a second subset, and the method comprises:
    calculating, for each of the plurality of driven components, an acceleration factor (AF) for reliability testing on a test bench, the acceleration factor (AF) defining a ratio between product lifetime under field loads and product lifetime under accelerated loads on the test bench;
    conducting, by the test bench and a drive unit operatively coupled to a processor, physical success run testing of the first subset of test specimens, wherein each test specimen in the first subset is operated by the drive unit for a same test duration;
    calculating, by the processor, a first confidence level achieved for reliability of each of the driven components based on the physical success run testing of the first subset of test specimens; characterized by:
    calculating, by the processor, a minimum test duration for one of the second subset of test specimens that will be required to confirm reliability of each of the driven components at a corresponding predetermined target confidence level that is separately defined for each of the driven components, the minimum test duration being based upon the acceleration factor (AF) of the one of the second subset of test specimens and based upon the first confidence level achieved by a corresponding one of the first subset of test specimens, and the one of the second subset of test specimens being selected based on which of the second subset of test specimens will require the most testing time to achieve the corresponding predetermined target confidence level after physical success run testing of the first and second subsets of test specimens is completed;
    conducting, by the test bench and the drive unit, physical success run testing of the second subset of test specimens, wherein the test bench tests the one of the second subset of test specimens for the minimum test duration; and
    reporting, by an output device operatively coupled to the processor, a cumulative confidence level achieved for reliability of the plurality of driven components based on successful conducting of physical success run testing,
    characterized in that the plurality of driven components includes a plurality of different products tested in parallel on the test bench, and characterized in that the first subset of test specimens includes one of each of the plurality of different products tested in parallel, and the second subset of test specimens also includes one of each of the plurality of different products tested in parallel, and
    characterized in that conducting the physical success run testing of the second subset of test specimens, which is for the minimum test duration that has been calculated, minimizes use of the test bench because results of the physical success run testing of the first subset of test specimens are applied to plan the physical success run testing of the second subset of test specimens.

2. The method of claim 1, further comprising:
    calculating, by the processor, a test duration for one of the first subset of test specimens, based upon the acceleration factor (AF) of the one of the first subset of test specimens.

3. The method of claim 2, wherein during the physical success run testing of the first subset of test specimens, each test specimen in the first subset is operated by the drive unit for the same test duration, and wherein during the physical success run testing of the second subset of test specimens, each test specimen in the second subset is operated by the drive unit for the minimum test duration that has been calculated.

4. The method of claim 1, wherein calculating the test duration for a selected one of the test specimens further comprises:
    applying a Lipson equation to calculate one modified test duration under normal conditions for the driven component associated with the selected one of the test specimens; and
    calculating one modified test duration under accelerated test bench conditions for the driven component associated with the selected one of the test specimens, based on the corresponding acceleration factor (AF) and the at least one modified test duration under normal conditions for the driven component associated with the selected one of the test specimens.

5. The method of claim 1, wherein conducting the physical success run testing for a selected first test specimen comprises:
    mounting the first test specimen on the test bench; and
    operating the drive unit to apply accelerated loads to the first test specimen on the test bench for a test duration associated with the first test specimen.

6. The method of claim 1, wherein calculating a cumulative confidence level achieved for reliability following a successful test of a selected test specimen further comprises:
    applying a Lipson equation to calculate a total number of specimens that would need to be tested for an original test duration equal to a desired running time in use for which the reliability is being tested;

applying a success run equation using the total number of specimens to calculate a non-cumulative, individual confidence level achieved by successful test of the selected test specimen;

applying a summing function to calculate a cumulative total number of specimens that would need to be tested for the original test duration for all test specimens of the driven component tested thus far; and applying the success run equation using the cumulative total number of specimens to calculate the cumulative confidence level achieved at an end of successful testing of the selected test specimen and all other test specimens of the driven component tested thus far.

7. The method of claim 1, wherein the plurality of driven components are defined by power train elements to be used in one or more wind turbines.

8. The method of claim 7, wherein the power train elements include one or more of a main bearing, a generator and a gearbox.

9. The method of claim 1, wherein the acceleration factor (AF) is calculated by applying the 63% mean lifetime of the Weibull distribution to a ratio of a mean product lifetime under field loads and a mean product lifetime under accelerated test bench loads.

* * * * *